US012200477B2

(12) United States Patent
Ishii

(10) Patent No.: US 12,200,477 B2
(45) Date of Patent: Jan. 14, 2025

(54) CONDITIONAL HANDOVERS AND MEASUREMENT REPORTS

(71) Applicant: SHARP KABUSHIKI KAISHA, Osaka (JP)

(72) Inventor: Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 386 days.

(21) Appl. No.: 17/605,201

(22) PCT Filed: Apr. 24, 2020

(86) PCT No.: PCT/JP2020/017850
§ 371 (c)(1),
(2) Date: Oct. 20, 2021

(87) PCT Pub. No.: WO2020/218587
PCT Pub. Date: Oct. 29, 2020

(65) Prior Publication Data
US 2022/0217597 A1   Jul. 7, 2022

Related U.S. Application Data

(60) Provisional application No. 62/839,424, filed on Apr. 26, 2019.

(51) Int. Cl.
*H04W 76/20* (2018.01)
*H04W 36/00* (2009.01)
(Continued)

(52) U.S. Cl.
CPC ....... *H04W 76/20* (2018.02); *H04W 36/0058* (2018.08); *H04W 36/00838* (2023.05); *H04W 36/362* (2023.05); *H04W 36/249* (2023.05)

(58) Field of Classification Search
CPC ....... H04W 36/00837; H04W 36/0058; H04W 36/0085; H04W 36/24; H04W 36/36; H04W 76/20
See application file for complete search history.

(56) References Cited

U.S. PATENT DOCUMENTS

| | | | | |
|---|---|---|---|---|
| 7,257,421 B2 * | 8/2007 | Vasudevan | ............ | H04W 36/34 455/437 |
| 8,600,387 B2 * | 12/2013 | Horn | ............... | H04W 36/00837 455/437 |

(Continued)

FOREIGN PATENT DOCUMENTS

| | | | | |
|---|---|---|---|---|
| CA | 3095896 A1 * | 10/2019 | ............ | H04W 24/08 |
| CA | 3095896 C * | 3/2024 | | |

(Continued)

OTHER PUBLICATIONS

Samsung, "Introduction of T312 for IRAT Eutra measurement in NR (Draft)", R2-1904387, 3GPP TSG-RAN WG2 Meeting #105bis, Xi'an, China, Mar. 8-Mar. 12, 2019.

(Continued)

*Primary Examiner* — Eric Nowlin
(74) *Attorney, Agent, or Firm* — ScienBiziP, P.C.

(57) ABSTRACT

A wireless terminal that communicates over a radio interface with a wireless access node of a radio access network (RAN), the wireless terminal comprising: receiver circuitry configured to receive from the wireless access node at least one reconfiguration message comprising a measurement object, a trigger configuration for a conditional handover and an identity of a candidate target cell; processor circuitry configured to: perform a measurement based on the measurement object, and; decide, based on the measurement and the trigger configuration, whether or not to execute the conditional handover to the candidate target cell; wherein:

(Continued)

the trigger configuration does not include a measurement report configuration.

7 Claims, 15 Drawing Sheets

(51) Int. Cl.
 *H04W 36/24* (2009.01)
 *H04W 36/36* (2009.01)

(56) References Cited

U.S. PATENT DOCUMENTS

| | | | | |
|---|---|---|---|---|
| 10,455,456 | B2* | 10/2019 | Jang | H04W 72/1215 |
| 10,999,771 | B2* | 5/2021 | Shi | H04W 36/00 |
| 11,272,417 | B2* | 3/2022 | Chen | H04W 36/365 |
| 11,290,924 | B2* | 3/2022 | Yao | H04W 36/0077 |
| 11,375,418 | B2* | 6/2022 | Kimba Dit Adamou | H04W 36/30 |
| 11,419,015 | B2* | 8/2022 | Da Silva | H04B 7/0695 |
| 11,582,663 | B2* | 2/2023 | Shi | H04W 36/00 |
| 11,706,668 | B2* | 7/2023 | Jokela | H04W 36/0016 370/331 |
| 11,729,672 | B2* | 8/2023 | Jang | H04W 72/1215 455/450 |
| 12,004,034 | B2* | 6/2024 | Shi | H04W 36/00 |
| 12,052,616 | B2* | 7/2024 | Lovlekar | H04W 36/0094 |
| 2005/0107110 | A1* | 5/2005 | Vasudevan | H04W 36/34 455/525 |
| 2010/0285806 | A1* | 11/2010 | Iwamura | H04W 36/30 455/437 |
| 2012/0100852 | A1* | 4/2012 | Horn | H04W 36/00837 455/436 |
| 2014/0334445 | A1* | 11/2014 | Wei | H04W 36/0094 370/331 |
| 2014/0369252 | A1* | 12/2014 | Wang | H04W 36/0077 370/312 |
| 2018/0227805 | A1* | 8/2018 | Jang | H04W 28/26 |
| 2019/0223073 | A1* | 7/2019 | Chen | H04W 36/0079 |
| 2020/0053600 | A1* | 2/2020 | Jang | H04W 36/249 |
| 2020/0229043 | A1* | 7/2020 | Yao | H04W 68/005 |
| 2021/0007021 | A1* | 1/2021 | Kimba Dit Adamou | H04W 76/36 |
| 2021/0068016 | A1* | 3/2021 | Shi | H04W 36/00 |
| 2021/0168678 | A1* | 6/2021 | Deenoo | H04W 76/19 |
| 2021/0243661 | A1* | 8/2021 | Shi | H04W 36/0085 |
| 2021/0297907 | A1* | 9/2021 | Jokela | H04W 36/0016 |
| 2021/0329652 | A1* | 10/2021 | Li | H04W 72/542 |
| 2021/0345191 | A1* | 11/2021 | Da Silva | H04W 76/19 |
| 2021/0360495 | A1* | 11/2021 | Lovlekar | H04W 36/0094 |
| 2022/0007254 | A1* | 1/2022 | Da Silva | H04W 36/0016 |
| 2022/0014979 | A1* | 1/2022 | Yiu | H04W 36/0077 |
| 2022/0078675 | A1* | 3/2022 | Xie | H04W 36/362 |
| 2022/0191755 | A1* | 6/2022 | Ohlsson | H04W 36/00835 |
| 2022/0217597 | A1* | 7/2022 | Ishii | H04W 36/0058 |
| 2022/0272589 | A1* | 8/2022 | Ishii | H04W 36/00837 |
| 2023/0180083 | A1* | 6/2023 | Shi | H04W 76/27 370/331 |
| 2023/0276320 | A1* | 8/2023 | Deenoo | H04W 24/08 370/331 |
| 2023/0388864 | A1* | 11/2023 | Jang | H04W 72/1268 |
| 2024/0015626 | A1* | 1/2024 | Chang | H04W 36/0058 |

FOREIGN PATENT DOCUMENTS

| | | | | |
|---|---|---|---|---|
| CN | 109600800 | A | * 4/2019 | H04W 36/0016 |
| CN | 110149664 | A | * 8/2019 | H04W 28/26 |
| CN | 110268742 | A | * 9/2019 | H04W 28/0268 |
| CN | 110493830 | A | * 11/2019 | H04W 24/10 |
| CN | 112136339 | A | * 12/2020 | H04W 24/08 |
| CN | 110149664 | B | * 4/2021 | H04W 28/26 |
| CN | 112956239 | A | * 6/2021 | H04W 36/0055 |
| CN | 110493830 | B | * 7/2021 | H04W 24/10 |
| CN | 113347664 | A | * 9/2021 | H04W 24/10 |
| CN | 109600800 | B | * 10/2021 | H04W 36/0016 |
| CN | 110268742 | B | * 2/2022 | H04W 28/0268 |
| CN | 114513809 | A | * 5/2022 | H04W 28/0268 |
| CN | 113347664 | B | * 9/2023 | H04W 24/10 |
| CN | 112136339 | B | * 2/2024 | H04W 24/08 |
| CN | 111418226 | B | * 4/2024 | H04B 7/0619 |
| CN | 118200998 | A | * 6/2024 | H04W 24/08 |
| CN | 118200999 | A | * 6/2024 | H04W 24/08 |
| EP | 1685683 | B1 | * 7/2014 | H04W 36/34 |
| EP | 2833654 | A1 | * 2/2015 | H04W 36/00 |
| EP | 3358901 | A1 | * 8/2018 | H04W 28/0268 |
| EP | 3755050 | A1 | * 12/2020 | H04W 28/26 |
| EP | 3796711 | A1 | * 3/2021 | H04W 24/10 |
| EP | 3358901 | B1 | * 1/2022 | H04W 28/0268 |
| EP | 3668182 | B1 | * 2/2022 | H04W 36/0016 |
| EP | 3996422 | A1 | * 5/2022 | H04W 36/0055 |
| JP | 2021518726 | A | * 8/2021 | |
| JP | 2021520114 | A | * 8/2021 | |
| JP | 7179064 | B2 | * 11/2022 | H04B 7/0619 |
| JP | 7187579 | B2 | * 12/2022 | H04W 24/10 |
| JP | 7273056 | B2 | * 5/2023 | H04W 24/08 |
| JP | 2023071718 | A | * 5/2023 | H04W 24/08 |
| KR | 20130022411 | A | * 3/2013 | |
| KR | 20140135994 | A | * 11/2014 | |
| KR | 101486897 | B1 | * 1/2015 | |
| KR | 20180090658 | A | * 8/2018 | |
| KR | 20210005584 | A | * 1/2021 | |
| KR | 20210020904 | A | * 2/2021 | |
| KR | 102303128 | B1 | * 9/2021 | |
| SG | 11202009766 | | * 10/2020 | |
| TW | I730268 | B | * 6/2021 | |
| WO | WO-2005050957 | A2 | * 6/2005 | H04W 36/34 |
| WO | WO-2011137399 | A1 | * 11/2011 | H04W 36/0055 |
| WO | WO-2018142861 | A1 | * 8/2018 | H04B 17/318 |
| WO | WO-2018143703 | A1 | * 8/2018 | H04W 28/0268 |
| WO | WO-2019062152 | A1 | * 4/2019 | H04W 36/0016 |
| WO | WO-2019108114 | A1 | * 6/2019 | H04B 7/0619 |
| WO | WO-2019157937 | A1 | * 8/2019 | H04W 28/26 |
| WO | WO-2019195060 | A1 | * 10/2019 | H04W 24/08 |
| WO | WO-2019218990 | A1 | * 11/2019 | H04W 24/10 |
| WO | WO-2020102158 | A2 | * 5/2020 | H04W 36/0055 |
| WO | WO-2020262123 | A1 | * 12/2020 | H04W 12/04 |

OTHER PUBLICATIONS

Samsung, "Introduction of early RLF declaration or fast handover failure recovery for PSCell in MR-DC (Draft)", R2-1904383, 3GPP TSG-RAN WG2 Meeting #105bis, Xi'an, China, Mar. 8-Mar. 12, 2019.

CMCC, "Consideration of Beamforming for NR Conditional Handover", R2-1904344, 3GPP TSG-RAN WG2 Meeting #105bis, Xi'an, China, Apr. 8-12, 2019.

Nokia et al., "Robustness through SRB duplication for split bearer solution in NR", R2-1904295, 3GPP TSG-RAN WG2 Meeting #105bis, Xian, China, Apr. 8-12, 2019.

Nokia et al., "CFRA resources update for Conditional HO", R2-1904294, 3GPP TSG-RAN WG2 Meeting #105bis, Xian, China, Apr. 8-12, 2019.

Nokia et al., "Beam selection and consolidation enhancements", R2-1904290, 3GPP TSG-RAN WG2 Meeting #105bis, Xi'an, China, Apr. 8-12, 2019.

Nokia et al., "Considerations for failure recovery in NR", R2-1904289, 3GPP TSG-RAN WG2 Meeting #105bis, Xi'an, China, Apr. 8-12, 2019.

Lenovo et al., "Conditional handover for NR", R2-1904171, 3GPP TSG-RAN WG2 Meeting #105bis, Xi'an, China, Apr. 8-Apr. 12, 2019.

NEC, "Reuse of conditional handover for SCG change in NR-DC", R2-1904069, 3GPP TSG-RAN WG2 #105bis, Xi'an, China, Apr. 8-12, 2019.

Etri, "Faster Handover Failure Recovery", R2-1903909, 3GPP TSG-RAN WG2 Meeting #105bis, Xi'an, China, Apr. 8-12, 2019.

Etri, "Signalling Overhead Reduction for Conditional Handover", R2-1903908, 3GPP TSG-RAN WG2 Meeting #105bis, Xi'an, China, Apr. 8-12, 2019.

(56) References Cited

OTHER PUBLICATIONS

Etri, "Service Interruption in Conditional Handover", R2-1903907, 3GPP TSG-RAN WG2 Meeting #105bis, Xi'an, China, Apr. 8-12, 2019.
Spreadtrum Communications, "Measurement report enhancement in conditional handover", R2-1903791, 3GPP TSG-RAN WG2 Meeting #105bis, Xi'an, China, Apr. 8-12, 2019.
Sharp, "Open issues for multiple candidate cells in conditional handover in NR", R2-1903768, 3GPP TSG-RAN WG2#105bis meeting, Xi'an, China, Apr. 8-12, 2019.
China Telecom, "Discussion on Conditional HO in NR", R2-1903675, 3GPP TSG-RAN WG2 Meeting #105b, Xian, China, Apr. 8-Apr. 12, 2019.
Qualcomm Incorporated, "Conditional HO design considerations", R2-1903651, 3GPP TSG-RAN WG2 Meeting #105bis, Xi'an, China, Apr. 8-Apr. 12, 2019.
Apple, "Enhancement on Highly Frequent HO Scenario", R2-1903613, 3GPP TSG-RAN WG2 Meeting #105bis, Xi'an, China, Apr. 8-Apr. 12, 2019.
Huawei et al., "Consideration on fast HO failure recovery", R2-1903569, 3GPP TSG-RAN WG2#105bis, Xi'an, China, Apr. 8-12, 2019.
Huawei et al., "Discussion on duplication during handover procedure", R2-1903568, 3GPP TSG-RAN WG2 #105bis, Xi'an, China, Apr. 8-12, 2019.
Huawei et al., "Discussion on CHO solution in NR", R2-1903567, 3GPP TSG-RAN WG2 #105bis, Xi'an, China, Apr. 8-12, 2019.
"3rd Generation Partnership Project; Technical Specification Group Radio Access Network; NR; NR and NG-RAN Overall Description; Stage 2(Release 15)", 3GPP TS 38.300 V15.5.0 (Mar. 2019).
Samsung, "Applying T312 on serving frequency in NR", R2-1905150, 3GPP TSG RAN WG2 Meeting #105bis, Xi'an, China, Apr. 8-12, 2019.
Samsung, "Introducing T312 for Pcell in NR", R2-1905149, 3GPP TSG RAN WG2 Meeting #105bis, Xi'an, China, Apr. 8-12, 2019.
Samsung Electronics, "Further enhancement of T312 in NR", R2-1905148, 3GPP TSG RAN WG2 Meeting #105bis, Xi'an, China, Apr. 8-12, 2019.
Samsung Electronics et al, "Introduction of T312 in NR", R2-1905147, 3GPP TSG RAN WG2 Meeting #105bis, Xi'an, China, Apr. 8-12, 2019.
Samsung, "Data forwarding for NR CHO", R2-1905146, 3GPP TSG RAN WG2 Meeting #105bis, Xi'an, China, Apr. 8-12, 2019.
Samsung, "Consideration of condition for NR CHO", R2-1905145, 3GPP TSG RAN WG2 Meeting #105bis, Xi'an, China, Apr. 8-12, 2019.
Samsung, "Using a timer for checking conditional handover failure in NR", R2-1905144, 3GPP TSG RAN WG2 Meeting #105bis, Xi'an, China, Apr. 8-12, 2019.
Samsung, "Deconfiguration of the configuration for conditional handover in NR", R2-1905143, 3GPP TSG RAN WG2 Meeting #105bis, Xi'an, China, Apr. 8-12, 2019.
Samsung, "Consideration of multiple candidate target cell for NR CHO", R2-1905142, 3GPP TSG RAN WG2 Meeting #105bis, Xi'an, China, Apr. 8-12, 2019.
Samsung Electronics, "NR specific simulation for the number of candidate cells in conditional handover", R2-1905141, 3GPP TSG-RAN WG2 Meeting #106, Xian, China, Apr. 8-12, 2019.
LG Electronics Inc., "Consideration on CHO Configuration", R2-1905094, 3GPP TSG-RAN WG2 Meeting #105bis, Xi'an, China, Apr. 8-Apr. 12, 2019.
LG Electronics Inc., "Consideration to Support Conditional HO in NR", R2-1905093, 3GPP TSG-RAN WG2 Meeting #105bis, Xi'an, China, Apr. 8-Apr. 12, 2019.
LG Electronics Inc., "Fast handover failure recovery with multiple RACH transmissions", R2-1905057, 3GPP TSG-RAN WG2 #105bis, Xian, China, Apr. 8-12, 2019.
Apple Inc., "On NR Mobility in FR2", R2-1904984, 3GPP RAN WG2 Meeting #105bis, Xi'an, China, Apr. 8-12, 2019.
Apple Inc., "Performance of Conditional HO in FR2", R2-1904980, 3GPP RAN WG2 Meeting #105bis, Xi'an, China, Apr. 8-12, 2019.
Nokia et al., "Robustness through SRB duplication for split bearer solution in NR", R2-1904544, 3GPP TSG-RAN WG2 Meeting #105bis, Xian, China, Apr. 8-12, 2019.
Samsung, "Discussion on fast RLF recovery enhancements in NR", R2-1904392, 3GPP, TSG-RAN WG2 Meeting #105bis, Xi'an, China, Apr. 8-12, 2019.
Samsung, "Introduction of early RLF declaration for PSCell in (NG)EN-DC (Draft)", R2-1904391, 3GPP TSG-RAN WG2 Meeting #105bis, Xi'an, China, Mar. 8-Mar. 12, 2019.
Samsung, "Introduction of T312 for IRAT NR measurement in EUTRA (Draft)", R2-1904390, 3GPP TSG-RAN WG2 Meeting #105bis, Xi'an, China, Mar. 8-Mar. 12, 2019.
Interdigital Inc., "Details of Conditional Handover Procedure for NR", R2-1903561, 3GPP TSG-RAN WG2 Meeting #105bis, Xi'an, China, Apr. 8-Apr. 12, 2019.
Interdigital Inc., "Triggers for Conditional Handover in NR", R2-1903560, 3GPP TSG-RAN WG2 Meeting #105bis, Xi'an, China, Apr. 8-Apr. 12, 2019.
Ericsson, "Repetition of RRC messages at handover", R2-1903531, 3GPP TSG RAN WG2 #105-bis, Xi'an, China, Mar. 8-12, 2019.
Ericsson, "Fast handover failure recovery", R2-1903530, 3GPP TSG RAN WG2 #105bis, Xi'an, China, Apr. 8-12, 2019.
Ericsson, "Fast RLF triggering based on timer T312", R2-1903529, 3GPP TSG RAN WG2 #105bis, Xi'an, China, Apr. 8-12, 2019.
Ericsson [To Be RAN2], "[Draft] Draft LS on Data forwarding for conditional handover", R2-1903528, 3GPP TSG-RAN WG2 Meeting #105bis, Xi'an, China, Apr. 8-12, 2019.
Ericsson, "Comparison of solutions for handover robustness", R2-1903527, 3GPP TSG-RAN WG2#105bis, Xian, China, Apr. 8-12, 2019.
Ericsson, "Validity Timer impact on Conditional Handover Performance", R2-1903526, 3GPP TSG RAN WG2 #105-pis, Xi'an, China, Apr. 8-12, 2019.
Ericsson, "Conditional Handover Performance", R2-1903525, 3GPP TSG RAN WG2 #105-bis, Xi'an, China, Apr. 8-12, 2019.
Ericsson, "TP to 38.300 on Conditional Handover in NR", R2-1903524, 3GPP TSG RAN WG2 #105bis, Xi'an, China, Apr. 8-12, 2019.
Ericsson, "On FR2 impact on CHO", R2-1903523, 3GPP TSG RAN WG2 #105bis, Xi'an, China, Apr. 8-12, 2019.
Ericsson, "Security implications of Conditional handover in NR", R2-1903522, 3GPP TSG RAN WG2 #105bis, Xi'an, China, Apr. 8-12, 2019.
Ericsson, "Suspend while monitoring CHO in NR", R2-1903521, 3GPP TSG RAN WG2 #105bis, Xi'an, China, Apr. 8-12, 2019.
Ericsson, "Conditional handover failures in NR", R2-1903520, 3GPP TSG RAN WG2 #105bis, Xi'an, China, Apr. 8-12, 2019.
Ericsson, "Deconfiguration of conditional handover in NR", R2-1903519, 3GPP TSG RAN WG2 #105bis, Xi'an, China, Apr. 8-Apr. 12, 2019.
Ericsson, "Conditional Handover Execution in NR", R2-1903518, 3GPP TSG RAN WG2 #105bis, Xi'an, China, Apr. 8-12, 2019.
Ericsson, "Triggering of Conditional Handover in NR", R2-1903517, 3GPP TSG RAN WG2 #105bis, Xi'an, China, Apr. 8-12, 2019.
Ericsson, "Configuration of Conditional handover", R2-1903516, 3GPP TSG RAN WG2 #105bis, Xi'an, China, Apr. 8-12, 2019.
Ericsson, "User plane aspects of conditional handover in NR", R2-1903515, 3GPP TSG RAN WG2 #105bis, Xi'an, China, Apr. 8-12, 2019.
Ericsson, "Stage-2 aspects of Conditional Handover in NR", R2-1903514, 3GPP TSG RAN WG2 #105bis, Xi'an, China, Apr. 8-12, 2019.
Intel Corporation, "Performance evaluation on exit condition for conditional handover", R2-1903452, 3GPP TSG RAN WG2 Meeting #105bis, Xi'an, China, Apr. 8-12, 2019.
Intel Corporation, "Further consideration on conditional handover", R2-1903451, 3GPP TSG RAN WG2 Meeting #105bis, Xian, China, Apr. 8-12, 2019.
Intel Corporation, "Report of the email discussion [105#58][NR/MOB] Comparison of LTE and NR Conditional handover", R2-1903450, 3GPP TSG RAN WG2 Meeting #105bis, Xi'an, China, Apr. 8-12, 2019.

(56) References Cited

OTHER PUBLICATIONS

Vivo, "Fast handover failure recovery in NR", R2-1903438, 3GPP TSG-RAN WG2 Meeting #105bis, Xi'an, China, Apr. 8-Apr. 12, 2019.

Vivo, "Triggers for conditional handover", R2-1903436, 3GPP TSG-RAN WG2 Meeting #105bis, Xi'an, China, Apr. 8-Apr. 12, 2019.

Catt, "Aspects for consideration in support of multiple cells in CHO", R2-1903357, 3GPP TSG-RAN WG2 Meeting #105bis, Xi'an, China, Apr. 4-8, 2019.

Catt, "Handling of Conditional Handover Failure in NR", R2-1903356, 3GPP TSG-RAN WG2 Meeting #105bis, Xi'an, China, Apr. 8-12, 2019.

Catt, "Open Issues of Conditional Handover in NR", R2-1903355, 3GPP TSG-RAN WG2 Meeting #105bis, Xi'an, China, Apr. 8-12, 2019.

Catt, "Consideration on the UE capability of supporting CHO", R2-1903354, 3GPP TSG-RAN WG2 Meeting #105bis, Xi'an, China, Apr. 8-12, 2019.

Oppo, "Further details on conditional handover for NR mobility enhancements", R2-1903309, 3GPP TSG-RAN WG2 Meeting #105bis, Xi'an, China, Apr. 8-Apr. 12, 2019.

Oppo, "Discussion on failure handling of handover for NR mobility", R2-1903305, 3GPP TSG-RAN WG2 Meeting #105bis, Xi'an, China, Apr. 8-Apr. 12, 2019.

Mediatek Inc., "Mobility Failure Recovery in NR", R2-1903244, 3GPP TSG-RAN WG2 Meeting #105bis, Xi'an, China, Apr. 8-12, 2019.

Mediatek Inc., "Conditional Handover in High Frequency", R2-1903243, 3GPP TSG-RAN WG2 Meeting #105bis, Xi'an, China, Apr. 8-12, 2019.

\* cited by examiner

| MEASUREMENT CONFIGURATION | | | |
|---|---|---|---|
| MEASUREMENT OBJECTS (MO) | REPORTING CONFIGURATIONS | MEASUREMENT IDENTITIES | QUANTITY CONFIGURATIONS | MEASUREMENT GAPS |

*Fig. 4*

| measId | BEST NEIGHBORING CELLS | CELLS THAT TRIGGERED REPORTING EVENT(S) | MEASURING RESULTS OF SERVING CELLS |
|---|---|---|---|

MEASUREMENT REPORT MESSAGE

Fig. 5

| CONDITIONAL HANDOVER CONFIGURATION MESSAGE | | | | |
|---|---|---|---|---|
| REF SIGNAL TYPE | IDENTITY(IES) OF CANDIDATE TARGETES | HANDOVER CONDITIONS | MEASUREMENT INSTRUCTIONS | PERIODIC VALUE | LEAVING CONDITIONS |

Fig. 8

CONDITIONAL HANDOVERS AND MEASUREMENT REPORTS

TECHNICAL FIELD

The technology relates to wireless communications, and particularly to radio architecture and operation for reporting measurements in a radio access network.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes LongTerm Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. An NG interface exists between 5GC and the base stations (i.e. gNB & ng-eNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

In typical cellular mobile communication systems, handover (HO) procedures are adopted to manage the mobility of a wireless terminal (e.g. User Equipment, UE). In general, there are two types of handovers: (1) make after break and (2) make before break. In make after break HO, a connection between a wireless terminal and a current (source) base station is temporarily disconnected before establishing a new connection between the wireless terminal and a target base station. In contrast, in make before break HO the new connection is prepared before breaking the connection with the current base station.

3GPP has completed the basic feature for new radio (NR) systems in Release 15 specification. 3GPP Release 15 describes only basic handover, i.e., make after break. The basic make after break handover described in 3GPP Release 15 is mainly based on LTE handover mechanism in which the network controls UE mobility based on UE measurement reporting. In the basic make after break handover described in 3GPP Release 15, similar to LTE, a source gNB triggers handover by sending a HO request to target gNB. After receiving an acknowledgement, ACK, from the target gNB, the source gNB initiates handover by sending a HO command to the UE, the HO command including the target cell configuration. The UE then performs an initial access to the target cell in order to establish a connection with the with target cell.

In 3GPP Release 16, standardization of several HO improvements is ongoing. Conditional handover (CHO) is one of such 3GPP Release 16 improvement aimed for increasing reliability and robustness of handovers. In CHO, the gNB of the source cell provides CHO configuration parameters including candidate target cells and triggering conditions to the UE in RRC_CONNECTED state. After receipt of the CHO configuration parameters, the UE may perform measurements of radio signals from the source cell as well as the candidate target cells, and may autonomously initiate a handover to one of the candidate cells whose triggering conditions are met.

What is needed, therefore, are apparatus, methods, and procedures to efficiently and effectively implement conditional handover and related measurement report procedures.

SUMMARY OF INVENTION

In one example, a wireless terminal that communicates over a radio interface with a wireless access node of a radio access network (RAN), the wireless terminal comprising: receiver circuitry configured to receive from the wireless access node at least one reconfiguration message comprising a measurement object, a trigger configuration for a conditional handover and an identity of a candidate target cell; processor circuitry configured to: perform a measurement based on the measurement object, and; decide, based on the measurement and the trigger configuration, whether or not to execute the conditional handover to the candidate target cell; wherein: the trigger configuration does not include a measurement report configuration.

In one example, a method for a wireless terminal that communicates over a radio interface with a wireless access node of a radio access network (RAN), the method comprising: receiving from the wireless access node at least one reconfiguration message comprising a measurement object, a trigger configuration for a conditional handover and an identity of a candidate target cell; performing a measurement based on the measurement object, and; deciding, based on the measurement and the trigger configuration, whether or not to execute the conditional handover to the candidate target cell; wherein: the trigger configuration does not include a measurement report configuration.

In one example, an access node of a radio access network (RAN), the access node comprising: processor circuitry configured to generate at least one reconfiguration message comprising a measurement object, a trigger configuration for a conditional handover and an identity of a candidate target cell; transmitter circuitry configured to transmit the at least one reconfiguration message; wherein: the trigger configuration does not include a measurement report configuration.

In one example, a method for an access node of a radio access network (RAN), the method comprising: generating at least one reconfiguration message comprising a measurement object, a trigger configuration for a conditional handover and an identity of a candidate target cell, and; transmitting the at least one reconfiguration message; wherein: the trigger configuration does not include a measurement report configuration.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 4 is a diagrammatic view showing example parameters of a measurement configuration which may be provided by a source node of a radio access network.

FIG. 5 is a diagrammatic view showing example information elements of an example MeasurementReport message.

FIG. 8 is a diagrammatic view showing example generic contents of an example conditional handover configuration message for the example embodiment of FIG. 6.

DESCRIPTION OF EMBODIMENTS

Figure 1:
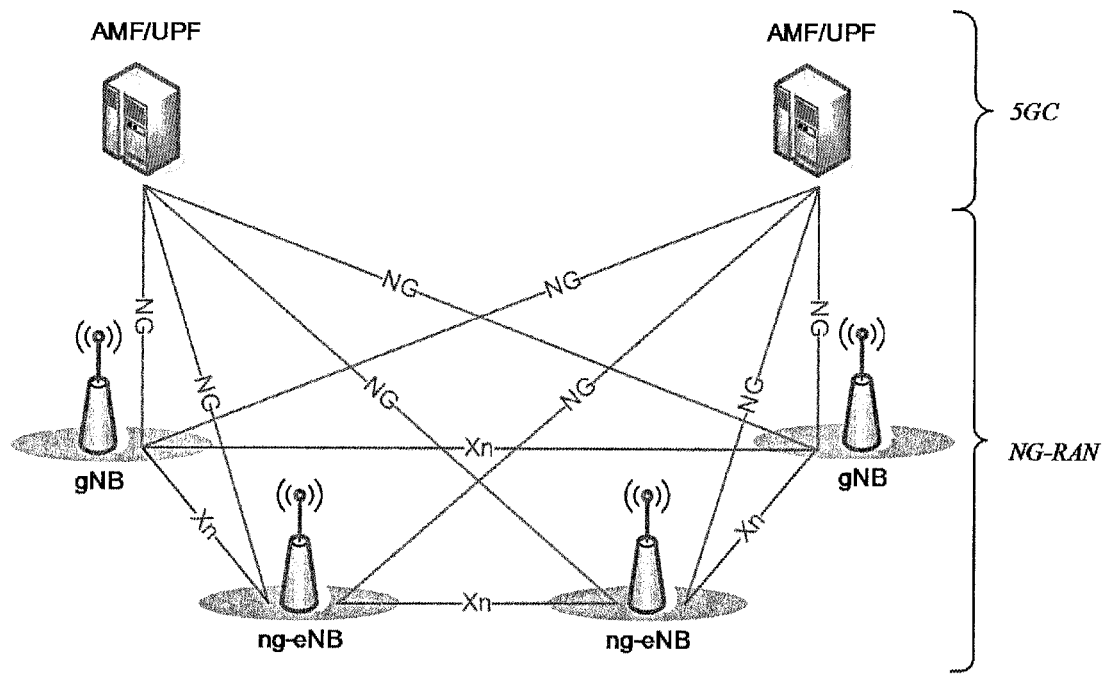
FIG. 1 is a diagrammatic view of overall architecture for a 5G New Radio system.

In one of its example aspects the technology disclosed herein concerns a wireless terminal that communicates over a radio interface with a wireless access node of a radio access network (RAN), and method of operating same. The wireless terminal comprises receiver circuitry, processor circuitry, and transmitter circuitry. The receiver circuitry is configured to receive from the wireless access node a configuration message to configure a conditional handover. The processor circuitry is configured to perform a measurement, to generate a measurement result, and to make a decision to send a measurement report including the measurement result. The transmitter circuitry is configured to transmit the measurement report. The configuration message comprises one or more identities of candidate target cell(s) and one or more conditions to perform a handover autonomously. The processor circuitry makes the decision to send the measurement report is based on the configuration message.

In another of its example aspects the technology disclosed herein concerns an access node of a radio access network (RAN). The access node comprises transmitter circuitry, receiver circuitry, and processor circuitry. The transmitter circuitry is configured to transmit to a wireless terminal a configuration message to configure a conditional handover. The receiver circuitry is configured to make a determination for reconfiguring the wireless terminal based on the measurement report. The processor circuitry is configured to make a determination for reconfiguring the wireless terminal based on the measurement report. The configuration message comprises one or more identities of candidate target cell(s) and one or more conditions to perform a handover autonomously. The decision for the wireless terminal to send the measurement report is based on the configuration message.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared, e.g., by a node. A frame, which may have both downlink portion(s) and uplink portion(s), is communicated between the base station and the wireless terminal. Each frame may comprise plural subframes, and a subframe may be divided into slots. The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and 1 are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

Figure 2:
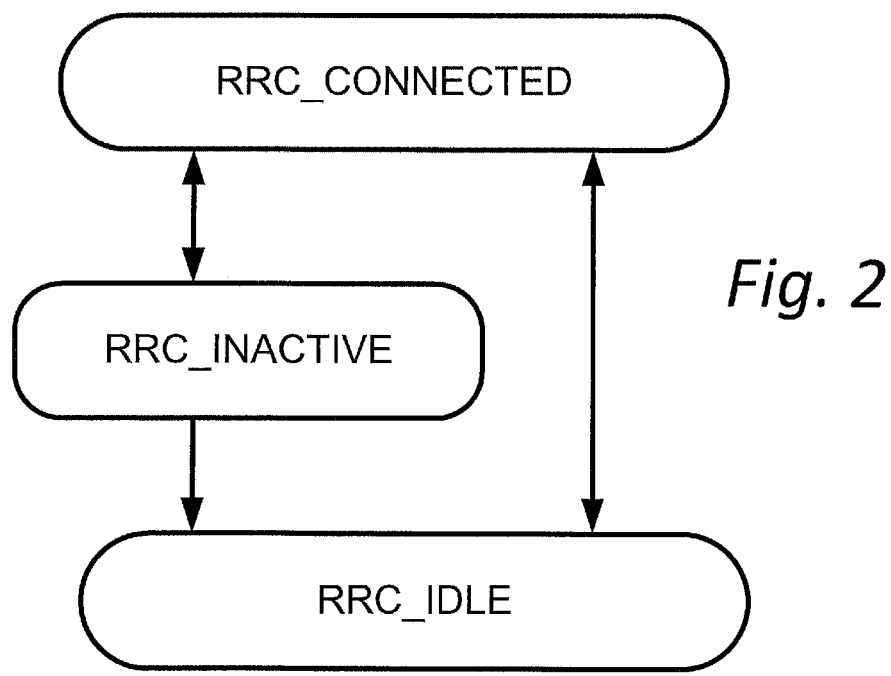
FIG. 2 is a diagrammatic view showing transition states of a Radio Resource Control RRC state machine.

As described herein, both an access node and a wireless terminal may manage respective Radio Resource Control (RRC) state machines. The RRC state machines transition between several RRC states including RRC_IDLE, RRC_INACTIVE and RRC_CONNECTED. FIG. 2 depicts the state transition diagram of the RRC states. From the vantage point of a wireless terminal e.g., user equipment (UE), the RRC states may be briefly characterized as follows:

RRC_IDLE:
  A UE specific DRX (discontinuous reception) may be configured by upper layers;
  UE controlled mobility based on network configuration;
  The UE:
    Monitors a Paging channel;
    Performs neighboring cell measurements and cell (re-) selection;
    Acquires system information.
RRC_INACTIVE:
  A UE specific DRX may be configured by upper layers or by RRC layer;
  UE controlled mobility based on network configuration;
  The UE stores the Access Stratum (AS) context;
  The UE:
    Monitors a Paging channel;
    Performs neighboring cell measurements and cell (re-) selection;
    Performs RAN-based notification area updates when moving outside the RAN-based notification area;
    Acquires system information.
RRC_CONNECTED:
  The UE stores the AS context.
  Transfer of unicast data to/from UE.

At lower layers, the UE may be configured with a UE specific DRX;

Network controlled mobility, i.e. handover within NR and to/from E-UTRAN.;

The UE:
Monitors a Paging channel;
Monitors control channels associated with the shared data channel to determine if data is scheduled for it;
Provides channel quality and feedback information;
Performs neighboring cell measurements and measurement reporting;
Acquires system information.

Figure 3:
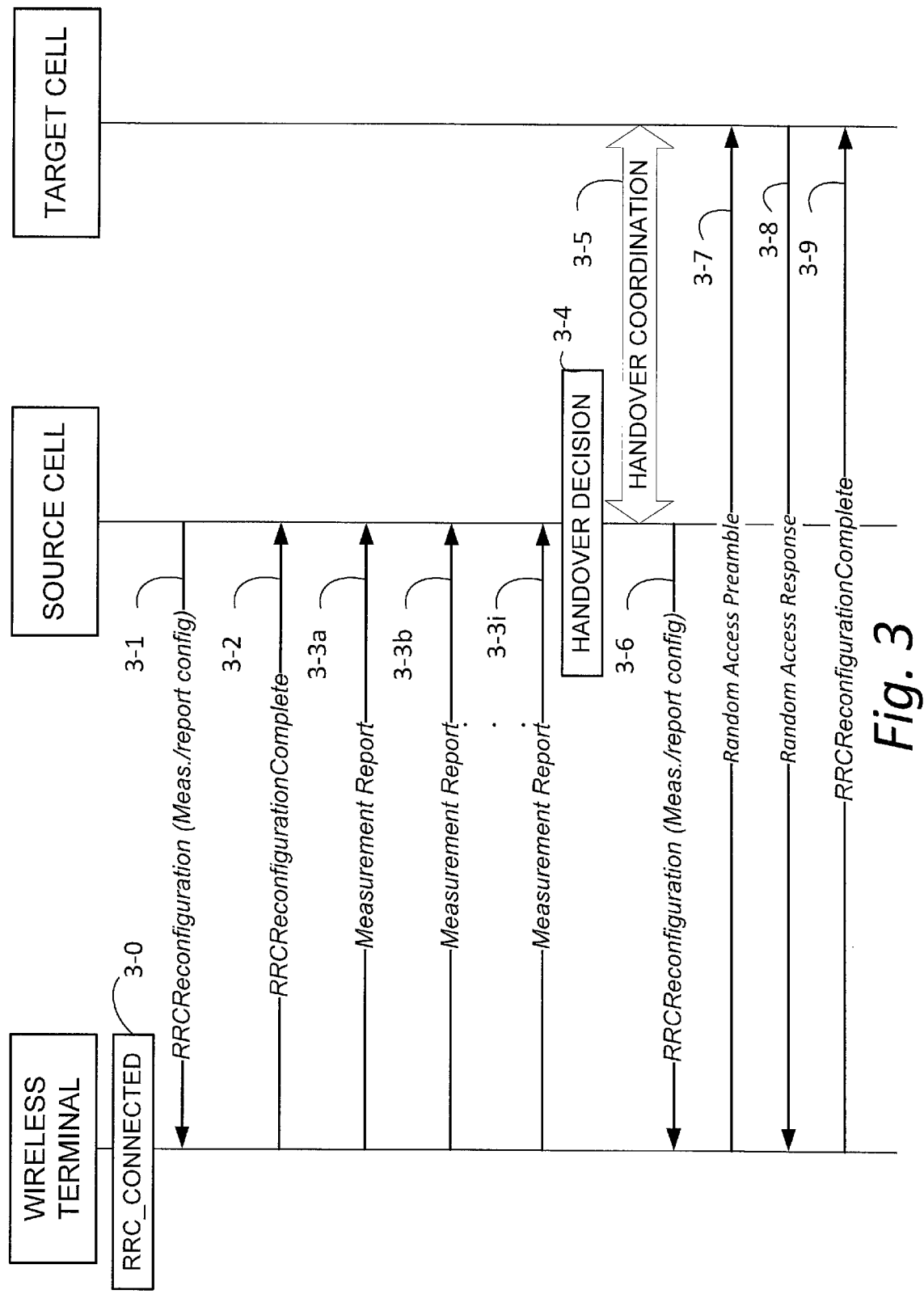
FIG. 3 is a diagrammatic view of showing signaling and messages of a procedure/scenario of a basic handover in an example cellular communications system.

FIG. 3 shows a procedure/scenario of a basic handover in a cellular communication system. During RRC_CONNECTED state, depicted by act 3-0, as act 3-1 the wireless terminal, e.g., UE, may receive RRCReconfiguration message from the gNB of the current serving cell (source cell). The RRCReconfiguration message of act 3-1 may comprise configuration parameters (a) for radio signal measurements and (b) reporting of measurement results (measurement configuration). The RRCReconfiguration message of act 3-1 may be acknowledged with an RRCReconfigurationComplete message, as shown by act 3-2. Thereafter, the UE may start measurements and, as shown by act 3-3*a*, act 3-3*b*, and act 3-3*i*, may transmit the results of the measurements to the gNB of the source cell based on the configuration parameters which were received in the RRCReconfiguration message of act 3-1. The configuration parameters may include radio resources (frequencies, sub-carrier spacing, etc.) for measurements and conditions to trigger reporting. Upon receiving one of the measurement reports of acts 3-3*x*, as act 3-4 the gNB of the source cell may determine whether or not to handover the UE to another cell. For example, when the measurement report indicates that signal quality from a neighbor cell (Target cell in FIG. 3) is better than the one from the source cell, the gNB of the source cell may initiate a handover to the target cell. As shown by act 3-5, the gNB may then conduct a coordination procedure to the gNB of the target cell. After the coordination depicted by act 3-5 is completed, as shown by act 3-6 the gNB of the target cell may send to the UE a RRCReconfiguration message. The RRCReconfiguration message of act 3-6 may include a command to handover to the target cell. Upon receiving RRCReconfiguration message of act 3-6 with the handover command, the UE may start an initial access to the target cell by sending Random Access Preamble as shown by act 3-7. In response to it sending of the Random Access Preamble as shown by act 3-7, the UE should receive a Random Access Response message as shown by act 3-8. The handover procedure is then completed by the UE sending a RRCReconfigurationComplete message to the gNB of the target cell, as shown by act 3-9.

In one configuration, the measurement configuration, which may be realized by the parameters of the RRCReconfiguration message of act 3-1, may comprise the parameters which are illustrated in FIG. 4 as "measurement objects", "reporting configurations", "measurement identities", "quantity configurations", and "measurement gaps', each of which are described below.

1. Measurement objects: A list of objects on which the UE shall perform the measurements.

For intra-frequency and inter-frequency measurements a measurement object (MO) indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For inter-RAT E-UTRA measurements a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

2. Reporting configurations: A list of reporting configurations where there can be one or multiple reporting configurations per measurement object. Each reporting configuration may comprise the following:

Reporting criterion: The criterion that triggers the UE to send a measurement report. This can either be periodical or a single event description.

Reference Signal (RS) type: The RS that the UE uses for beam and cell measurement results (synchronization signal SS/Physical Broadcast Channel PBCH block or Channel State Information-Reference Signal CSI-RS).

Reporting format: The quantities per cell and per beam that the UE includes in the measurement report, e.g. received signal received power, RSRP and other associated information such as the maximum number of cells and the maximum number beams per cell to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A UE in RRC_CONNECTED state may maintain a measurement object list, a reporting configuration list, and a measurement identities list. The measurement object list may possibly include NR measurement object(s) and inter-RAT objects. Similarly, the reporting configuration list may include NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures may distinguish the three types of cells: the serving cell(s), the listed cell(s), and the detected cell(s). The listed cells are cells listed within the measurement object(s). The detected cells are cells that are not listed within the measurement object(s) but are detected by the UE on the synchronization signal block, SSB, frequency(ies) and subcarrier spacing(s) indicated by the measurement object(s).

For measurement object(s), the UE measures and reports on the serving cell(s), listed cells and/or detected cells. For inter-RAT measurements object(s) of E-UTRA, the UE measures and reports on listed cells and detected cells.

Listing 1 shows an example implementation of the measurement configuration, per 3GPP TS 38.331 v15.5.1.

Listing 1

```
MeasConfig ::=                          SEQUENCE {
    measObjectToRemoveList              MeasObjectToRemoveList
OPTIONAL,      -- Need N
    measObjectToAddModList              MeasObjectToAddModList
OPTIONAL,      -- Need N
    reportConfigToRemoveList
ReportConfigToRemoveList
OPTIONAL,      -- Need N
    reportConfigToAddModList
ReportConfigToAddModList
OPTIONAL,      -- Need N
    measIdToRemoveList                  MeasIdToRemoveList
OPTIONAL,      -- Need N
    measIdToAddModList                  MeasIdToAddModList
OPTIONAL,      -- Need N
    s-MeasureConfig                     CHOICE {
        ssb-RSRP                            RSRP-Range,
        csi-RSRP                            RSRP-Range
    }
OPTIONAL,      -- Need M
```

```
    quantityConfig              QuantityConfig
OPTIONAL,    -- Need M measGapConfig               MeasGapConfig
OPTIONAL,    -- Need M measGapSharingConfig        MeasGapSharingConfig
OPTIONAL,    -- Need M

...
}

MeasObjectToRemoveList ::=    SEQUENCE (SIZE
(1..maxNrofObjectId)) OF MeasObjectId MeasIdToRemoveList ::=          SEQUENCE (SIZE
(1..maxNrofMeasId)) OF MeasId ReportConfigToRemoveList ::=   SEQUENCE (SIZE
(1..maxReportConfigId)) OF ReportConfigId MeasIdToAddModList ::=    SEQUENCE (SIZE (1..maxNrofMeasId)) OF
MeasIdToAddMod MeasIdToAddMod ::=               SEQUENCE {
    measId                       MeasId,
    measObjectId                 MeasObjectId,
    reportConfigId               ReportConfigId
```

```
}

MeasObjectNR ::=                      SEQUENCE { ssbFrequency                      ARFCN-ValueNR

OPTIONAL,    -- Cond SSBorAssociatedSSB ssbSubcarrierSpacing              SubcarrierSpacing OPTIONAL,    -- Cond SSBorAssociatedSSB smtc1                             SSB-MTC OPTIONAL,    -- Cond SSBorAssociatedSSB smtc2                             SSB-MTC2

OPTIONAL,    -- Cond IntraFreqConnected refFreqCSI-RS                     ARFCN-ValueNR OPTIONAL,    -- Cond CSI-RS referenceSignalConfig             ReferenceSignalConfig, absThreshSS-BlocksConsolidation   ThresholdNR OPTIONAL,    -- Need R absThreshCSI-RS-Consolidation     ThresholdNR OPTIONAL,    -- Need R nrofSS-BlocksToAverage            INTEGER(2..maxNrofSS-
BlocksToAverage)                      OPTIONAL,    -- Need R nrofCSI-RS-ResourcesToAverage     INTEGER(2..maxNrofCSI-
RS-ResourcesToAverage)

OPTIONAL,    -- Need R quantityConfigIndex               INTEGER
(1..maxNrofQuantityConfig),
```

Listing 2 shows an example procedure of measurement report triggering.

```
    offsetMO                     Q-OffsetRangeList,
    cellsToRemoveList            PCI-List
OPTIONAL,    -- Need N
    cellsToAddModList            CellsToAddModList
OPTIONAL,    -- Need N
    blackCellsToRemoveList       PCI-RangeIndexList
OPTIONAL,    -- Need N
    blackCellsToAddModListSEQUENCE(SIZE(1..maxNrofPCI-
Ranges)) OF PCI-RangeElement
OPTIONAL,    -- Need N
    whiteCellsToRemoveList       PCI-RangeIndexList
OPTIONAL,    -- Need N
    whiteCellsToAddModList       SEQUENCE (SIZE
(1..maxNrofPCI-Ranges)) OF PCI-RangeElement
OPTIONAL,    -- Need N
    ... ,
    [[
    freqBandIndicatorNR-v1530    FreqBandIndicatorNR
OPTIONAL,    -- Need R
    measCycleSCell-v1530         ENUMERATED {sf160,
sf256, sf320, sf512, sf640, sf1024, sf1280}
OPTIONAL    -- Need R
    ]]
}
```

```
CellsToAddModList ::=           SEQUENCE (SIZE
(1..maxNrofCellMeas)) OF CellsToAddMod CellsToAddMod ::=               SEQUENCE {
    physCellId                      PhysCellId,
    cellIndividualOffset            Q-OffsetRangeList
}

ReportConfigToAddModList ::=    SEQUENCE (SIZE
(1..maxReportConfigId)) OF ReportConfigToAddMod ReportConfigToAddMod ::=        SEQUENCE {
    reportConfigId                  ReportConfigId,
    reportConfig                    CHOICE {
        reportConfigNR                  ReportConfigNR,
        ...,
        reportConfigInterRAT
ReportConfigInterRAT
    }
}

ReportConfigNR ::=              SEQUENCE {
    reportType                      CHOICE {
        periodical
PeriodicalReportConfig,
```

```
        eventTriggered
EventTriggerConfig,
        ...,
        reportCGI                              ReportCGI
    }
}

ReportCGI ::=                    SEQUENCE {
    cellForWhichToReportCGI        PhysCellId,
        ...
}

EventTriggerConfig::=            SEQUENCE {
    eventId                                CHOICE {
        eventA1                                SEQUENCE {
            a1-Threshold
MeasTriggerQuantity,
            reportOnLeave
BOOLEAN,
            hysteresis
Hysteresis,
            timeToTrigger
TimeToTrigger
        },
        eventA2                                     SEQUENCE {
```

```
            a2-Threshold
MeasTriggerQuantity,
        reportOnLeave
BOOLEAN,
        hysteresis
Hysteresis,
        timeToTrigger
TimeToTrigger
    },
    eventA3                                SEQUENCE {
        a3-Offset
MeasTriggerQuantityOffset,
        reportOnLeave
BOOLEAN,
        hysteresis
Hysteresis,
        timeToTrigger
TimeToTrigger,
        useWhiteCellList                   BOOLEAN
    },
    eventA4                                SEQUENCE {
        a4-Threshold
MeasTriggerQuantity,
        reportOnLeave
BOOLEAN,
```

```
            hysteresis
Hysteresis,
        timeToTrigger
TimeToTrigger,
        useWhiteCellList                        BOOLEAN
    },
    eventA5                                     SEQUENCE {
        a5-Threshold1
MeasTriggerQuantity,
        a5-Threshold2
MeasTriggerQuantity,
        reportOnLeave
BOOLEAN,
        hysteresis
Hysteresis,
        timeToTrigger
TimeToTrigger,
        useWhiteCellList                        BOOLEAN
    },
    eventA6                                     SEQUENCE {
        a6-Offset
MeasTriggerQuantityOffset,
        reportOnLeave
BOOLEAN,
        hysteresis
```

```
Hysteresis,
        timeToTrigger
TimeToTrigger,
        useWhiteCellList                    BOOLEAN
    },
    ...
    }, rsType                                  NR-RS-Type, reportInterval                          ReportInterval, reportAmount                            ENUMERATED {r1,
r2, r4, r8, r16, r32, r64, infinity}, reportQuantityCell
MeasReportQuantity, maxReportCells                          INTEGER
(1..maxCellReport), reportQuantityRS-Indexes
MeasReportQuantity
OPTIONAL,    -- Need R maxNrofRS-IndexesToReport               INTEGER
(1..maxNrofIndexesToReport)  OPTIONAL,  -- Need R includeBeamMeasurements                 BOOLEAN,
```

```
    reportAddNeighMeas              ENUMERATED
{setup}                             OPTIONAL,
-- Need R
    ...
}

PeriodicalReportConfig ::=    SEQUENCE {
    rsType                          NR-RS-Type, reportInterval                  ReportInterval, reportAmount                    ENUMERATED {r1,
r2, r4, r8, r16, r32, r64, infinity}, reportQuantityCell
MeasReportQuantity, maxReportCells                  INTEGER
(1..maxCellReport), reportQuantityRS-Indexes
MeasReportQuantity
OPTIONAL,   -- Need R
    maxNrofRS-IndexesToReport       INTEGER
(1..maxNrofIndexesToReport)  OPTIONAL,  -- Need R
    includeBeamMeasurements         BOOLEAN,
    useWhiteCellList                BOOLEAN,
```

```
    ...
}

NR-RS-Type ::=                      ENUMERATED {ssb,
csi-rs}

MeasTriggerQuantity ::=             CHOICE {
    rsrp                                RSRP-Range,
    rsrq                                RSRQ-Range,
    sinr                                SINR-Range
}

MeasTriggerQuantityOffset ::=       CHOICE {
    rsrp                                INTEGER (-
30..30),
    rsrq                                INTEGER (-
30..30),
    sinr                                INTEGER (
-30..30)
}

MeasReportQuantity ::=  SEQUENCE {
    rsrp                                BOOLEAN,
    rsrq                                BOOLEAN,
```

```
    sinr                       BOOLEAN
}

MeasIdToAddModList ::=   SEQUENCE (SIZE (1..maxNrofMeasId)) OF
MeasIdToAddMod

MeasIdToAddMod ::=                 SEQUENCE {
    measId                   MeasId,
    measObjectId             MeasObjectId,
    reportConfigId           ReportConfigId
}
```

Listing 2

Event A1: Serving becomes better than absolute threshold;
Event A2: Serving becomes worse than absolute threshold;
Event A3: Neighbour becomes amount of offset better than PCell/PSCell;
Event A4: Neighbour becomes better than absolute threshold;
Event A5: PCell/PSCell becomes worse than absolute threshold1 AND Neighbour/SCell becomes better than another absolute threshold2;
Event A6: Neighbour becomes amount of offset better than SCell.
1> for each measId included in the measIdList within VarMeasConfig:
  2> if the corresponding reportConfig includes a reportType set to eventTriggered or periodical:
    3> if the corresponding measObject concerns NR:
      4> if the eventA1 or eventA2 is configured in the corresponding reportConfig:
        5> consider only the serving cell to be applicable;
      4> if the eventA3 or eventA5 is configured in the corresponding reportConfig:
        5> if a serving cell is associated with a measObjectNR and neighbours are associated with another measObjectNR, consider any serving cell associated with the other measObjectNR to be a neighbouring cell as well;
      4> for measurement events other than eventA1 or eventA2:
        5> if useWhiteCellList is set to true:
          6> consider any neighbouring cell detected based on parameters in the associated measObjectNR to be applicable when the concerned cell is included in the whiteCellsToAddModList defined within the VarMeasConfig for this measId;
        5> else:
          6> consider any neighbouring cell detected based on parameters in the associated measObjectNR to be applicable when the concerned cell is not included in the blackCellsToAddModList defined within the VarMeasConfig for this measId;
    3> else if the corresponding measObject concerns E-UTRA:
      4> consider any neighbouring cell detected on the associated frequency to be applicable when the concerned cell is not included in the blackCellsToAddModListEUTRAN defined within the VarMeasConfig for this measId;
  2> else if the corresponding reportConfig includes a reportType set to reportCGI:
    3> consider the cell detected on the associated measObject which has a physical cell identity matching the value of the cellForWhichToReportCGI included in the corresponding reportConfig within the VarMeasConfig to be applicable;
  2> if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
    3> include a measurement reporting entry within the VarMeasReportList for this measId;
    3> set the numberOfReportsSent defined within the VarMeasReportList for this measId to 0;
    3> include the concerned cell(s) in the cellsTriggeredList defined within the VarMeasReportList for this measId;
    3> initiate the measurement reporting procedure;
  2> else if the reportType is set to eventTriggered and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):

Listing 2 -continued

3> set the numberOfReportsSent defined within the VarMeasReportList for this measId to 0;
    3> include the concerned cell(s) in the cellsTriggeredList defined within the VarMeasReportList for this measId;
    3> initiate the measurement reporting procedure;
  2> else if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:
    3> remove the concerned cell(s) in the cellsTriggeredList defined within the VarMeasReportList for this measId;
    3> if reportOnLeave is set to true for the corresponding reporting configuration:
      4> initiate the measurement reporting procedure;
    3> if the cellsTriggeredList defined within the VarMeasReportList for this measId is empty:
      4> remove the measurement reporting entry within the VarMeasReportList for this measId;
      4> stop the periodical reporting timer for this measId, if running;
  2> if reportType is set to periodical and if a (first) measurement result is available:
    3> include a measurement reporting entry within the VarMeasReportList for this measId;
    3> set the numberOfReportsSent defined within the VarMeasReportList for this measId to 0;
    3> if the reportAmount exceeds 1:
      4> initiate the measurement reporting procedure, as specified in 5.5.5, immediately after the quantity to be reported becomes available for the NR SpCell;
    3> else (i.e. the reportAmount is equal to 1):
      4> initiate the measurement reporting procedure, immediately after the quantity to be reported becomes available for the NR SpCell and for the strongest cell among the applicable cells;
  2> upon expiry of the periodical reporting timer for this measId:
    3> initiate the measurement reporting procedure.
  2> if reportType is set to reportCGI:
    3> if the UE acquired the SIB1 or SystemInformationBlockType1 for the requested cell; or
    3> if the UE detects that the requested NR cell is not transmitting SIB1 (see TS 38.213 [13], clause 13):
      4> stop timer T321;
      4> include a measurement reporting entry within the VarMeasReportList for this measId;
      4> set the numberOfReportsSent defined within the VarMeasReportList for this measId to 0;
      4> initiate the measurement reporting procedure;
  2> upon the expiry of T321 for this measId:
    3> include a measurement reporting entry within the VarMeasReportList for this measId;
    3> set the numberOfReportsSent defined within the VarMeasReportList for this measId to 0;
    3> initiate the measurement reporting procedure.

In the measurement reporting procedure described above, the UE may transmit the MeasurementReport message to the gNB of the serving cell (source cell). The MeasurementReport message may comprise measId that triggered the measurement reporting, measurement result(s) of serving cell(s), best neighboring cells, and/or cells that triggered reporting event(s), as illustrated by way of example in FIG. 5. It should be noted that for event-driven (eventTriggered) reporting, there are two conditions: entry condition and leaving condition. The entry condition is met when a specific event occurs, whereas the leaving condition is met when the condition of the specific event no longer exists. In addition, a parameter for hysteresis may be involved in determining the entry/leaving conditions to avoid ping-pong effects. For example, for Event A1, the entry condition is met when the signal strength of the serving cell is better than a1-threshold+hysteresis, whereas the leaving condition is met when the signal strength is lower than a1-threshod–hysteresis. When the entry condition is met, the UE may generate and send MeasurementReport. On the other hand, when the leaving condition is met, whether or not to send MeasurementReport may depend on the parameter reportOnLeave associated with a concerned event.

Listing 3 shows an example implementation of a MeasurementReport.

---

Listing 3

```
MeasurementReport ::=               SEQUENCE {
   criticalExtensions                 CHOICE {
     measurementReport                   MeasurementReport-IEs,
     criticalExtensionsFuture  SEQUENCE { }
   }
}
MeasurementReport-IEs ::=           SEQUENCE {
   measResults                         MeasResults,
   lateNonCriticalExtension            OCTET STRING
OPTIONAL,
   nonCriticalExtension                SEQUENCE{ }
OPTIONAL
}
MeasResults ::=                     SEQUENCE {
   measId                              MeasId,
   measResultServingMOList   MeasResultServMOList,
   measResultNeighCells                CHOICE {
     measResultListNR                     MeasResultListNR,
     ...,
     measResultListEUTRA       MeasResultListEUTRA
   }
OPTIONAL,
   ...
}
MeasResultServMOList ::=   SEQUENCE (SIZE
(1..maxNrofServingCells)) OF MeasResultServMO
MeasResultServMO ::=                SEQUENCE {
   servCellId                          ServCellIndex,
   measResultServingCell               MeasResultNR,
   measResultBestNeighCell             MeasResultNR
OPTIONAL,
   ...
}
MeasResultListNR ::= SEQUENCE (SIZE (1..maxCellReport)) OF
MeasResultNR
MeasResultNR ::=                    SEQUENCE {
   physCellId                          PhysCellId
OPTIONAL,
   measResult                          SEQUENCE {
     cellResults                         SEQUENCE{
       resultsSSB-Cell                     MeasQuantityResults
OPTIONAL,
       resultsCSI-RS-Cell                  MeasQuantityResults
OPTIONAL
     },
     rsIndexResults                      SEQUENCE{
       resultsSSB-Indexes   ResultsPerSSB-IndexList
OPTIONAL,
       resultsCSI-RS-Indexes   ResultsPerCSI-RS-IndexList
OPTIONAL
     }
OPTIONAL
   },
   ...,
   [[
   cgi-Info                            CGI-Info
OPTIONAL
   ]]
}
...
```

---

Three example embodiments and modes of conditional handover configurations and measurement reporting systems and techniques according to the technology disclosed herein.

1: Conditional Handover Configurations and Reporting

Figure 6:
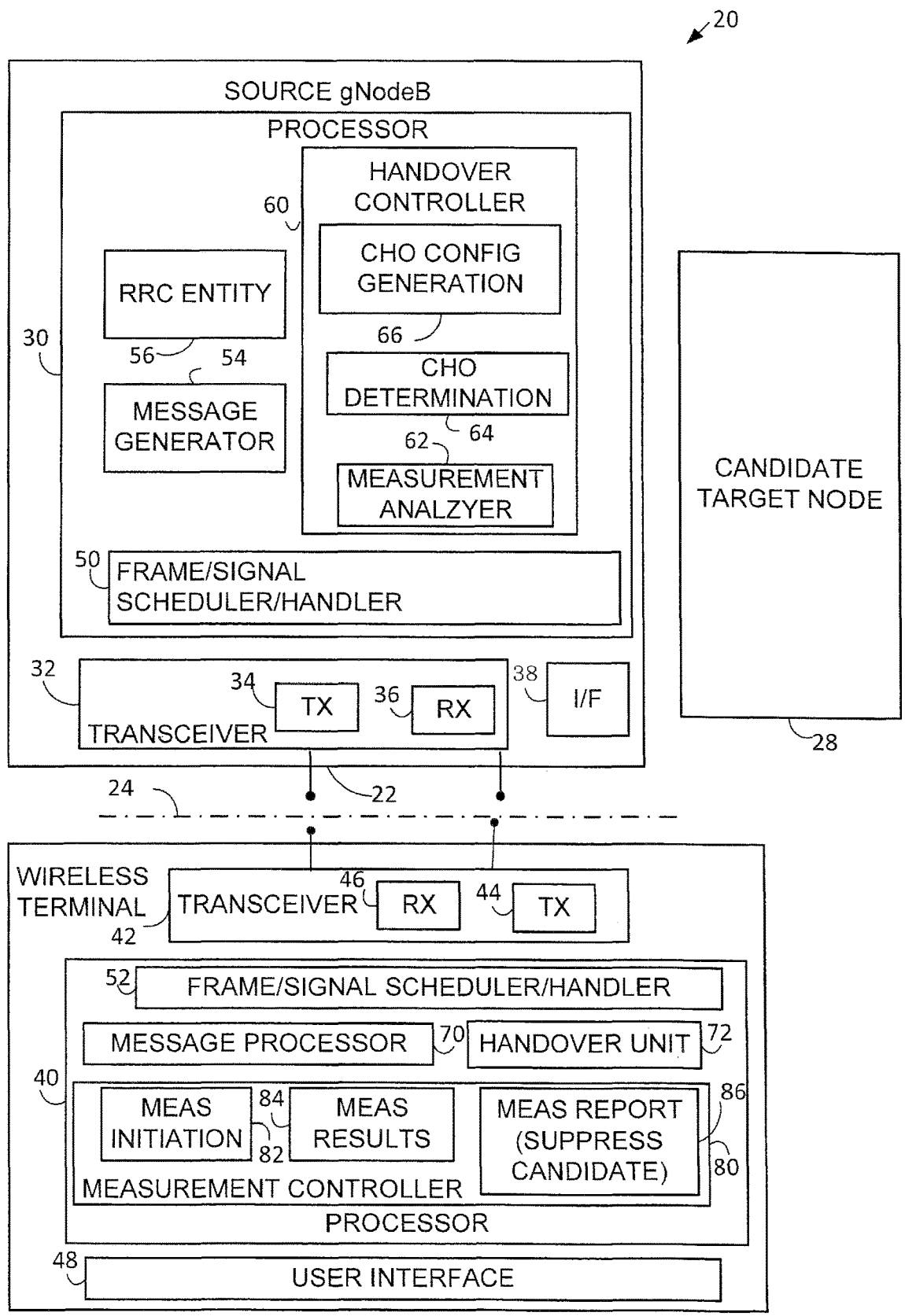
FIG. 6 is a schematic view of an example communications system comprising a source gNodeB which provides a wireless terminal with conditional handover configuration information which the wireless terminal may use for controlling generation and/or content of measurement reports.

FIG. 6 shows an example communications system 20 wherein a source radio access node 22 communicates over air or radio interface 24 (e.g., Uu interface) with wireless terminal 26. The source radio access node may also communication with a target radio access node 28 over an appropriate interface, such as either the radio interface 24 in the case of a backhaul configuration or $X_n$ interface in the manner shown in FIG. 1.

As mentioned above, the radio access node 22 may be any suitable node for communicating with the wireless terminal 26, such as a base station node, gNodeB ("gNB") or eNodeB ("eNB"), for example. For sake of simplicity, the source radio access node 22 may herein briefly be referred to as the source node 22, or source gNodeB 22, or source gNB 22. Similarly, the target radio access node 28 may herein briefly be referred to as the target node 28, or target gNodeB 28, or target gNB 28.

The source gNodeB 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively. In addition, source gNodeB 22 may comprise inter-node interface circuitry 38 for communicating with target gNodeB 28. Although not shown as such, it should be understood that he target gNodeB 28 may similarly have its own node processor 30, node transceiver circuitry 32, and inter-node interface circuitry 38.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The respective transmitter circuits 36 and 46 may comprise, e.g., amplifier(s), modulation circuitry and other conventional transmission equipment. The respective receiver circuits 34 and 44 may comprise, e.g., amplifiers, demodulation circuitry, and other conventional receiver equipment.

In general operation, source gNodeB 22 and wireless terminal 26 communicate with each other across radio interface 24 using predefined configurations of information. By way of non-limiting example, the source gNodeB 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between source gNodeB 22 and wireless terminal 26 over radio interface 24, the node processor 30 and terminal processor 40 of FIG. 6 are shown as comprising respective information handlers. For an example implementation in which the information is communicated via frames, the information handler for source gNodeB 22 is shown as node frame/signal scheduler/handler 50, while the information handler for wireless terminal 26 is shown as terminal frame/signal handler 52.

The node processor 30 of source gNodeB 22 also includes message generator 54, RRC state machine 56, and handover controller 60. The RRC state machine 56 may operate in a manner understood from FIG. 2, and may interact with message generator 54 for the generation of RRC messages such as RRCReconfiguration messages, for example. The handover controller 60 may comprise measurement analyzer 62, conditional handover (CHO) determination unit 64, and conditional handover configuration information generator 66.

The terminal processor 40 of node processor 30 also includes message processor 70, handover unit 72, and measurement controller 80. The measurement controller 80 in turn further comprises measurement initiation unit 82; measurement results unit 84; and measurement report control unit 86.

Figure 7:
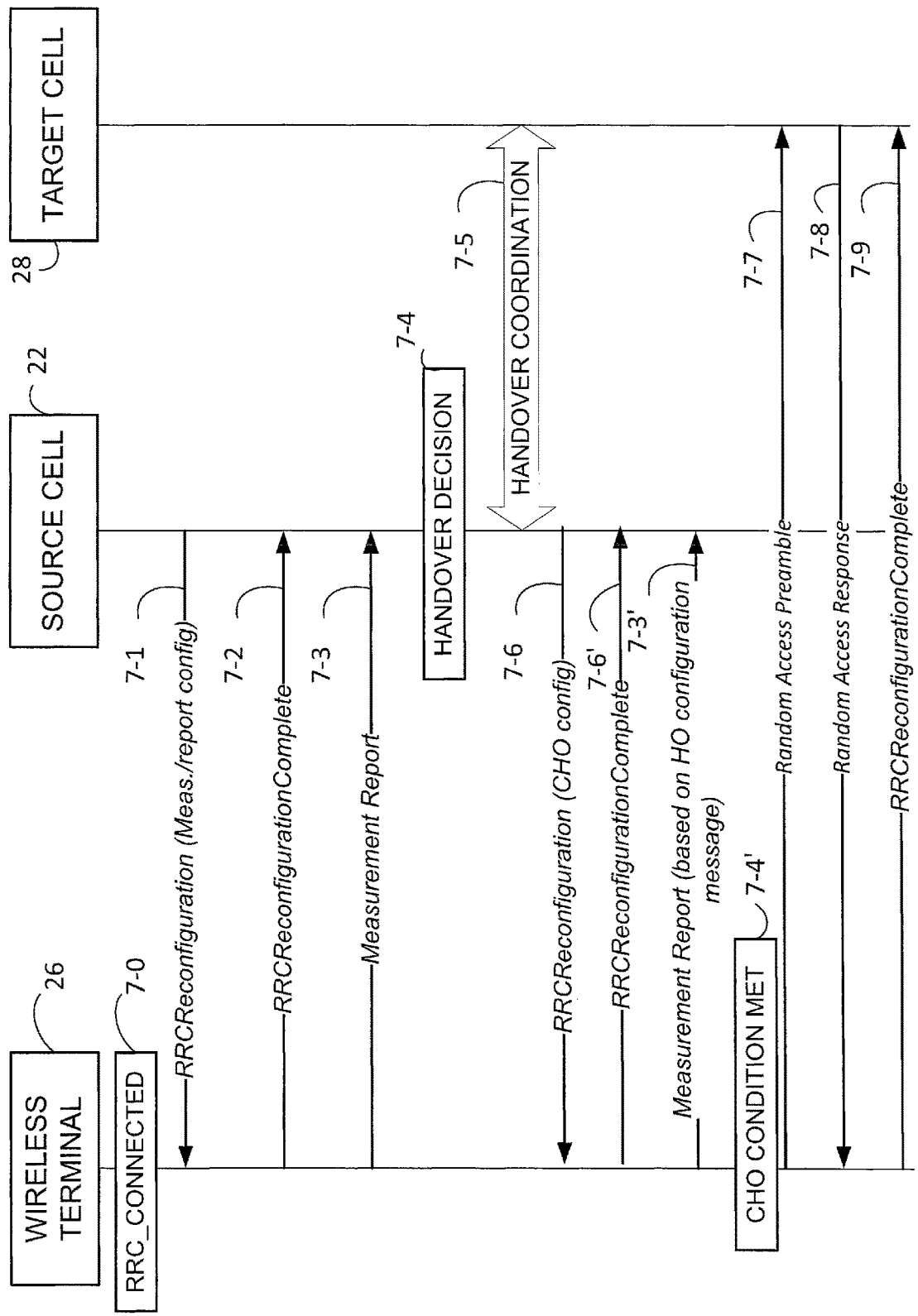
FIG. 7 is a diagrammatic view showing signaling and messages involved in measurement report in a conditional handover situation for the example cellular communications system of FIG. 6.

FIG. 7 illustrates an example scenario in which the communications system of FIG. 6 may execute a conditional handover. Some acts of FIG. 7 are similar to those of FIG. 3 have similar suffixed act numbers, for example, act 7-0, like act 2-0 shows that the UE is in RRC_CONNECTED state. Similarly, act 7-1, like act 3-1, shows that the wireless terminal 26 may be configured by the gNB 22 of the serving cell (source cell) with the measurement configuration. The measurement configuration of act 7-1 may be similar to the measurement configuration of Listing 1. Based on the measurement configuration received in act 7-1, the wireless terminal 26 may send measurement reports 7-3. The timing of the measurements made by wireless terminal 26 may be governed by 82, the measurement results analysed by measurement results unit 84, and the measurement reports may be generated by 86. The measurement reports may be similar to the example implementation shown in Listing 3. Example logic for triggering the decision of act 7-4, e.g., a procedure for measurement report triggering, may be understood with reference to Listing 1.

FIG. 7 further shows that, in this particular scenario, as act 7-4 the gNB 22 makes a decision to send the conditional handover (CHO) configuration to the wireless terminal 26. The decision of act 7-4, which may be made by conditional handover (CHO) determination unit 64, is triggered by the measurement result(s) of the target cell, i.e., a measurement report 7-3, as assessed by measurement analyzer 62. Act 7-5 shows a handover coordination procedure which is performed after the decision of act 7-4. The handover coordination procedure of act 7-5 is performed to prepare both source gNodeB 22 and target gNodeB 28 for the possibility of the handover. The communications involved in the handover coordination procedure of act 7-5 may be transmitted over the inter-node interface 34.

In one example implementation, after the handover decision of act 7-4 and the handover coordination procedure of act 12-5, as shown by act 7-6 a message may be sent to wireless terminal 26 to carry the conditional handover CHO configuration information. The conditional handover configuration information for the message of act 7-6 may be generated by conditional handover configuration information generator 66. In one example implementation the message of act 7-6 may be an RRCReconfiguration message. In another example implementation (not illustrated), another suitable message (e.g. RRCCHOConfiguration) may be used to send the conditional handover configuration information. Upon successful receipt of the message of act 7-6, i.e., the message that includes and sends the conditional handover configuration information to wireless terminal 26, a response or acknowledgement message is returned to source gNodeB 22 as shown by act 7-6'.

In an example implementation, the message used for act 7-6, e.g., the message that includes the CHO configuration information, may comprise the following parameters:
  Identification(s) of candidate target cell(s)
  Event(s) to trigger execution of CHO
  RACH configuration(s) of the candidate target cell(s)
  UL/DL configuration(s) of the candidate target cell(s)
  New UE identity(ies) (e.g. RNTI) to be used for the candidate target cell(s).

FIG. 8 generically shows various general information elements or types of information that may be included in the conditional handover configuration message of act 7-6, including but not limited to: reference signal type (e.g. SSB or CSI-RS); identifier(s) of candidate target nodes; handover conditions; measurement instructions; periodic values for periodic reporting, and leaving conditions. The last three aforementioned information elements may be optional and may be discussed in conjunction with other example embodiments and modes.

Listing 4 shows an information element CHOConfig, which is an example implementation of an information element (IE) to be included in the message of act 7-6 which is used for the CHO configuration. In this example implementation, the condition(s) to trigger measurement report (EventTriggerConfigCHO) may be configured separately from the conditions included in measConfig (EventTriggerConfig).

Listing 4

```
CHOConfig ::=                    SEQUENCE {
    CHOConfigToRemoveList        CHOConfigToRemoveList
OPTIONAL,  -- Need N
    CHOConfigToAddModList        CHOConfigToAddModList
OPTIONAL,  -- Need N
    }
OPTIONAL,  -- Need M
CHOConfigToRemoveList ::= SEQUENCE (SIZE
(1..maxNrofCHOConfigId)) OF CHOConfigId
ReportConfigToAddModList ::= SEQUENCE (SIZE
(1..maxCHOConfigId)) OF CHOConfigToAddMod
CHOConfigToAddMod ::= SEQUENCE {
    choConfigId                  CHOConfigId,
    reportConfig                 CHOICE {
        choConfigNR              CHOConfigNR,
        ...,
        choConfigInterRAT        choConfigInterRAT
    }
}
```

-continued

Listing 4

```
CHOConfigNR ::=                SEQUENCE {
    CHOConditionList           SEQUENCE (SIZE
(1..maxCHOConditionList)) OF CHOCondition
}
CHOCondition                   SEQUENCE {
    candidateCellIDList        SEQUENCE (SIZE
(1..maxCandidateCellIDList)) OF PhysCellId eventTriggered
EventTriggerConfigCHO,
    ...,
    reportCGI                  ReportCGI
}
spCellConfigCommon             ServingCellConfigCommon
OPTIONAL,   -- Need M
    newUE-Identity             RNTI-Value,
    validity         ENUMERATED {ms50, ms100, ms150, ms200,
ms500, ms1000, ms2000, ms10000},
    rach-ConfigDedicated       CHOICE {
        uplink                 RACH-ConfigDedicated,
        supplementaryUplink    RACH-ConfigDedicated
    }
OPTIONAL,   -- Need N
}
EventTriggerConfigCHO::=       SEQUENCE {
    eventId                    CHOICE {
        eventA1                SEQUENCE {
            a1-Threshold            MeasTriggerQuantity,
        },
        eventA2                SEQUENCE {
            a2-Threshold            MeasTriggerQuantity,
        },
        eventA3                SEQUENCE {
            a3-Offset               MeasTriggerQuantityOffset,
        },
        eventA4                SEQUENCE {
            a4-Threshold            MeasTriggerQuantity,
        },
        eventA5                SEQUENCE {
            a5-Threshold1           MeasTriggerQuantity,
            a5-Threshold2           MeasTriggerQuantity,
        },
        eventA6                SEQUENCE {
            a6-Offset               MeasTriggerQuantityOffset,
        },
        ...
    },
    rsType                     NR-RS-Type
...
}
```

After receiving the CHO configuration in the message of act 7-6 of FIG. 7, the wireless terminal 26 could, as in previous practice, continue the measurement procedure based on the measurement configuration received earlier, e.g., the measurement configuration received in act 7-1 before the handover decision of act 7-4. The earlier measurement configuration, e.g., the pre-conditional measurement configuration information, may include a measurement object that includes the measurement parameters covering the candidate target cell(s). Additionally, the measurement object of the pre-conditional measurement configuration information may also include the candidate target cell(s) in the whitelisted cells. In such a case, the measurement object could trigger a measurement report based on the associated (linked) report configuration. However, the serving cell, e.g., source gNodeB 22, has already negotiated with each of the candidate target cell(s), and the wireless terminal 26 is allowed to autonomously execute a handover to one of the candidate target cell(s) as long as the CHO configuration remains valid. Therefore, once the CHO configuration is provided in the message of act 7-5, it may be wasteful to send a measurement report with regard to any of the candidate target cell(s).

In view of the foregoing, as one of its features and advantages, the wireless terminal 26 of FIG. 6 may suppress measurement reports with regard to a candidate target cell included in the CHO configuration, when the measurement result of the signal from the candidate target cell satisfies the reporting condition specified in the corresponding reporting configuration. In other words, the wireless terminal 26 may transmit a measurement report when the measurement results available in the UE include the result(s) from cell(s) other than the one(s) configured as candidate target cell(s). Accordingly, the measurement report control unit 86 of wireless terminal 26 is labeled as a measurement report control unit 86 which may suppress the reporting of measurements for candidate target gNodeBs.

To reflect the foregoing, FIG. 7 shows as act 7-3' the wireless terminal 26 sending a measurement report which is based on the conditional handover configuration. For example, assume that one measurement object is linked to an event-triggered reporting configuration. If the measurement with regard to this measurement object results in finding a cell that meets the triggering condition in the reporting configuration, the wireless terminal 26 of FIG. 6 may send a measurement report if the identification of the found cell (e.g. physical cell ID) is for none of the candidate target cell(s) in the CHO configuration. Otherwise the UE may determine not to send the measurement report. If measurement results for cells other than the candidate target cell(s) are available, the wireless terminal 26 may be allowed to include in the measurement report the results from the candidate target cell(s) along with the results from the cells other than the candidate target cells.

Act 7-4' shows that the wireless terminal 26 may make a determination that the conditional handover conditions of the conditional handover configuration information are satisified, and that a handover to a candidate target gNodeB 28 should occur. The determination of act 7-4' may be made by handover unit 72 of wireless terminal 26. Thereafter, the wireless terminal 26 may seek access to target gNodeB 28 by engaging in a random access procedure, as shown by act 7-7 and act 7-8. Act 7-7 comprises wireless terminal 26 sending a Random Access Preamble to target gNodeB 28. Upon successful receipt and recognition by target gNodeB 28 of the Random Access Preamble of act 7-7, the wireless terminal 26 should receive a Random Access Response message as shown by act 7-8. The handover procedure is then completed by the wireless terminal 26 sending an RRCReconfigurationComplete message to the target gNodeB 28, as shown by act 7-9.

Figure 9:
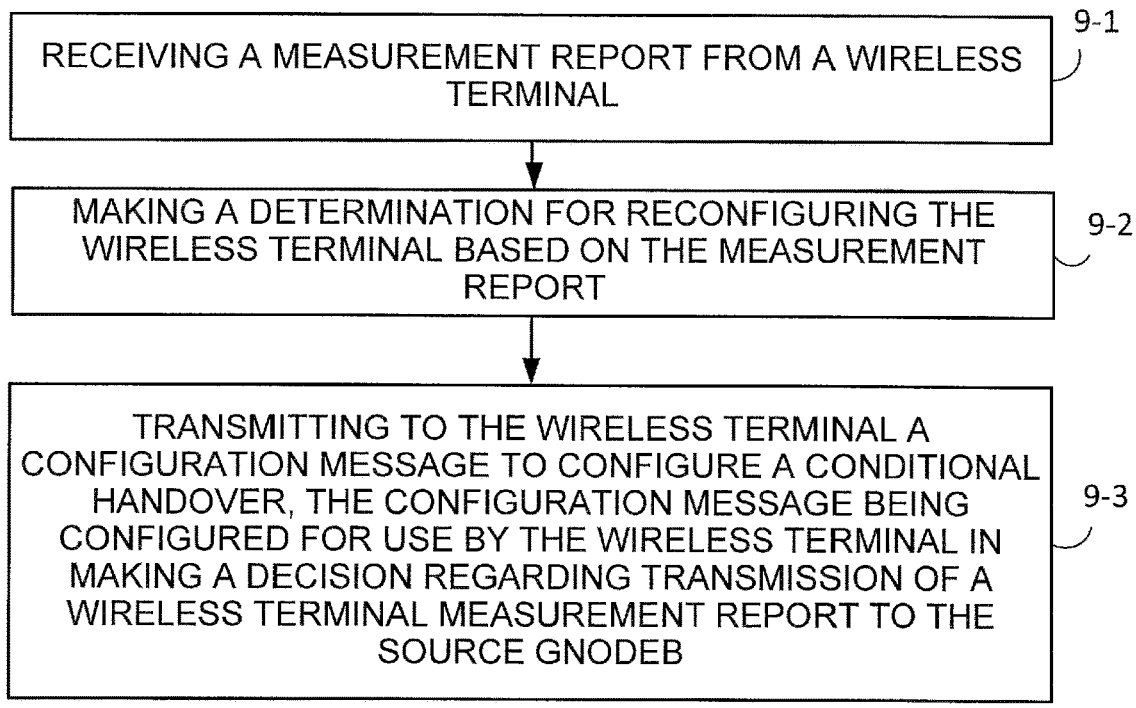
FIG. 9 is a flowchart showing example, basic, representative steps or acts performed by a source node of the system of FIG. 6.

The source gNodeB 22 of FIG. 6 thus provides wireless terminal 26 with conditional handover configuration information which the wireless terminal 26 may use for controlling generation and/or content of measurement reports. Example, representative, basic acts performed by source gNodeB 22 of FIG. 6 are shown in FIG. 9. Act 9-1 comprises receiving a measurement report from a wireless terminal. The measurement report of act 9-1 may be a report message such as message 7-3 of FIG. 7. Act 9-2 comprises making a determination for reconfiguring the wireless terminal based on the measurement report. The determination of act 9-2 may be made by conditional handover (CHO) determination unit 64 of source gNodeB 22, and may further be reflected by act 7-4 of FIG. 7. Act 9-3 comprises transmitting to the wireless terminal a configuration message to configure a conditional handover, the configuration message being configured for use by the wireless terminal in making a decision regarding transmission of a wireless terminal measurement report to the source gNodeB 22.

Figure 10:
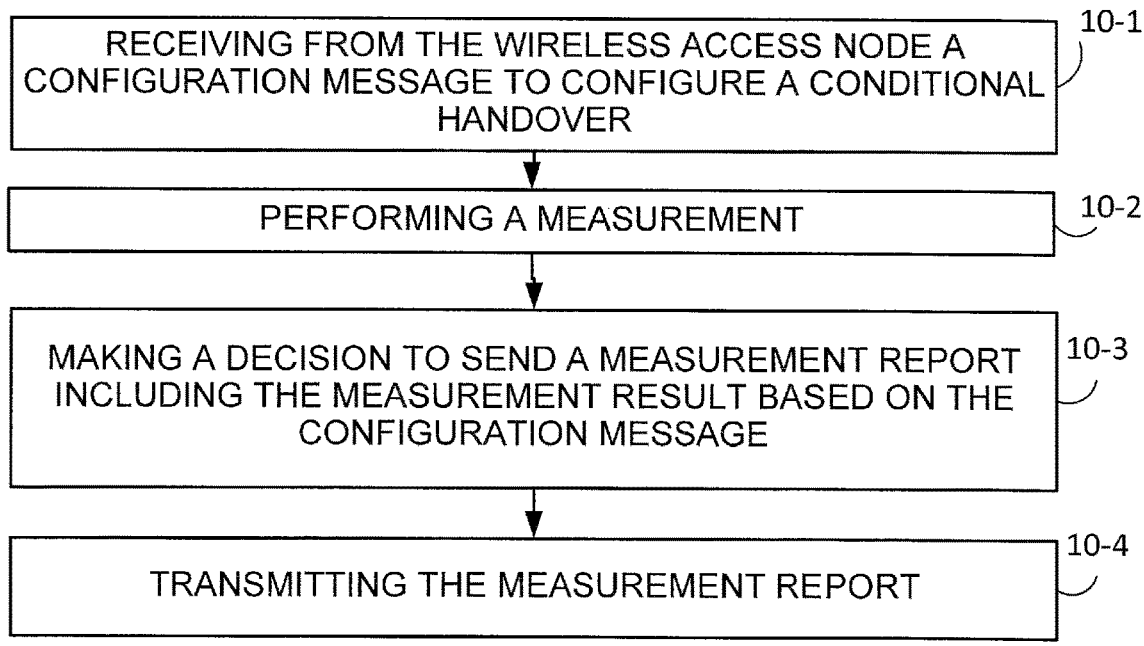
FIG. 10 is a flowchart showing example, basic, representative steps or acts performed by a wireless terminal of the system of FIG. 6.

Example, representative, basic acts performed by wireless terminal 26 of FIG. 6 are shown in FIG. 10. Act 10-1 comprises receiving from the wireless access node a configuration message to configure a conditional handover. The conditional handover configuration message of act 10-1 may be the message of act 7-5 as described above. Act 10-2 comprises the wireless terminal 26 performing a measurement. The measurement may be initiated by measurement initiation unit 82 of wireless terminal 26. Act 10-3 comprises the wireless terminal 26 making a decision, based on the configuration message of act 10-2, to send a measurement report including the measurement result. Act 10-4 comprises transmitting the measurement report to source gNodeB 22.

Listing 5 is an example procedure of measurement report triggering, based on Listing 2 with revisions for supporting the embodiment and mode of FIG. 6 and FIG. 7 marked as bold text.

Listing 5

```
1>  for each measId included in the measIdList within
      VarMeasConfig:
  2>    if the corresponding reportConfig includes a
          reportType set to eventTriggered or periodical:
    3>    if the corresponding measObject concerns NR:
      4>  if the eventA1 or eventA2 is configured in the
          corresponding reportConfig:
        5>    consider only the serving cell to be
              applicable;
      4>    if the eventA3 or eventA5 is configured in the
            corresponding reportConfig:
        5>    if a serving cell is associated with a
              measObjectNR and neighbours are associated with
              another measObjectNR, consider any serving cell
              associated with the other measObjectNR to be a
              neighbouring cell as well;
      4>    for measurement events other than eventA1 or
            eventA2:
        5>    if useWhiteCellList is set to true:
          6>    consider any neighbouring cell detected based
                on parameters in the associated measObjectNR to
                be applicable when the concerned cell is
                included in the whiteCellsToAddModList defined
                within the VarMeasConfig for this measId;
        5>    else:
          6>    consider any neighbouring cell detected based
                on parameters in the associated measObjectNR to
                be applicable when the concerned cell is not
                included in the blackCellsToAddModList defined
                within the VarMeasConfig for this measId;
    3>    else if the corresponding measObject concerns E-
          UTRA:
      4>    consider any neighbouring cell detected on the
            associated frequency to be applicable when the
            concerned cell is not included in the
            blackCellsToAddModListEUTRAN defined within the
            VarMeasConfig for this measId;
  2>    else if the corresponding reportConfig includes a
        reportType set to reportCGI:
    3>    consider the cell detected on the associated
          measObject which has a physical cell identity matching
          the value of the cellForWhichToReportCGI included in
          the corresponding reportConfig within the
          VarMeasConfig to be applicable;
  2>    if the reportType is set to eventTriggered and if
        the entry condition applicable for this event, i.e. the
        event corresponding with the eventId of the
        corresponding reportConfig within VarMeasConfig, is
        fulfilled for one or more applicable cells for all
        measurements after layer 3 filtering taken during
        timeToTrigger defined for this event within the
        VarMeasConfig, while the VarMeasReportList does not
        include a measurement reporting entry for this measId (a
        first cell triggers the event):
    3>    include a measurement reporting entry within the
          VarMeasReportList for this measId;
```

Listing 5 -continued

```
    3>    set the numberOfReportsSent defined within the
          VarMeasReportList for this measId to 0;
    3>    include the concerned cell(s) in the
          cellsTriggeredList defined within the VarMeasReportList
          for this measId;
    3>  if cellsTriggeredList includes cells other than the
        candidate target cell(s) configured by CHOConfig;
      4>    initiate the measurement reporting procedure;
  2>    else if the reportType is set to eventTriggered and
        if the entry condition applicable for this event, i.e.
        the event corresponding with the eventId of the
        corresponding reportConfig within VarMeasConfig, is
        fulfilled for one or more applicable cells not included
        in the cellsTriggeredList for all measurements after
        layer 3 filtering taken during timeToTrigger defined for
        this event within the VarMeasConfig (a subsequent cell
        triggers the event):
    3>    set the numberOfReportsSent defined within the
          VarMeasReportList for this measId to 0;
    3>    include the concerned cell(s) in the
          cellsTriggeredList defined within the
          VarMeasReportList for this measId;
    3>  if cellsTriggeredList includes cells other than the
        candidate target cell(s) configured by CHOConfig;
      4>    initiate the measurement reporting procedure;
  2>    else if the reportType is set to eventTriggered and
        if the leaving condition applicable for this event is
        fulfilled for one or more of the cells included in the
        cellsTriggeredList defined within the VarMeasReportList
        for this measId for all measurements after layer 3
        filtering taken during timeToTrigger defined within the
        VarMeasConfig for this event:
    3>    remove the concerned cell(s) in the
          cellsTriggeredList defined within the
          VarMeasReportList for this measId;
    3>    if reportOnLeave is set to true for the
          corresponding reporting configuration:
      4>    initiate the measurement reporting procedure;
    3>    if the cellsTriggeredList defined within the
          VarMeasReportList for this measId is empty:
      4>    remove the measurement reporting entry within the
            VarMeasReportList for this measId;
      4>    stop the periodical reporting timer for this measId,
            if running;
  2>    if reportType is set to periodical and if a (first)
        measurement result is available:
    3>    include a measurement reporting entry within the
          VarMeasReportList for this measId;
    3>    set the numberOfReportsSent defined within the
          VarMeasReportList for this measId to 0;
    3>    if the reportAmount exceeds 1:
      4>    initiate the measurement reporting procedure, as
            specified in 5.5.5, immediately after the quantity
            to be reported becomes available for the NR SpCell;
    3>    else (i.e. the reportAmount is equal to 1):
      4>    initiate the measurement reporting procedure,
            immediately after the quantity to be reported
            becomes available for the NR SpCell and for the
            strongest cell among the applicable cells;
  2>    upon expiry of the periodical reporting timer for
        this measId:
    3>    initiate the measurement reporting procedure.
  2>    if reportType is set to reportCGI:
    3>    if the UE acquired the SIB1 or
          SystemInformationBlockType1 for the requested cell; or
    3>    if the UE detects that the requested NR cell is not
          transmitting SIB1 (see TS 38.213 [13], clause 13):
      4>    stop timer T321;
      4>    include a measurement reporting entry within the
            VarMeasReportList for this measId;
      4>    set the numberOfReportsSent defined within the
            VarMeasReportList for this measId to 0;
      4>    initiate the measurement reporting procedure;
```

-continued

Listing 5

```
2>   upon the expiry of T321 for this measId:
3>     include a measurement reporting entry within the
       VarMeasReportList for this measId;
3>     set the numberOfReportsSent defined within the
       VarMeasReportList for this measId to 0;
3>     initiate the measurement reporting procedure.
```

2: Measurement Reporting after Conditional Handover Configuration

Figure 11:
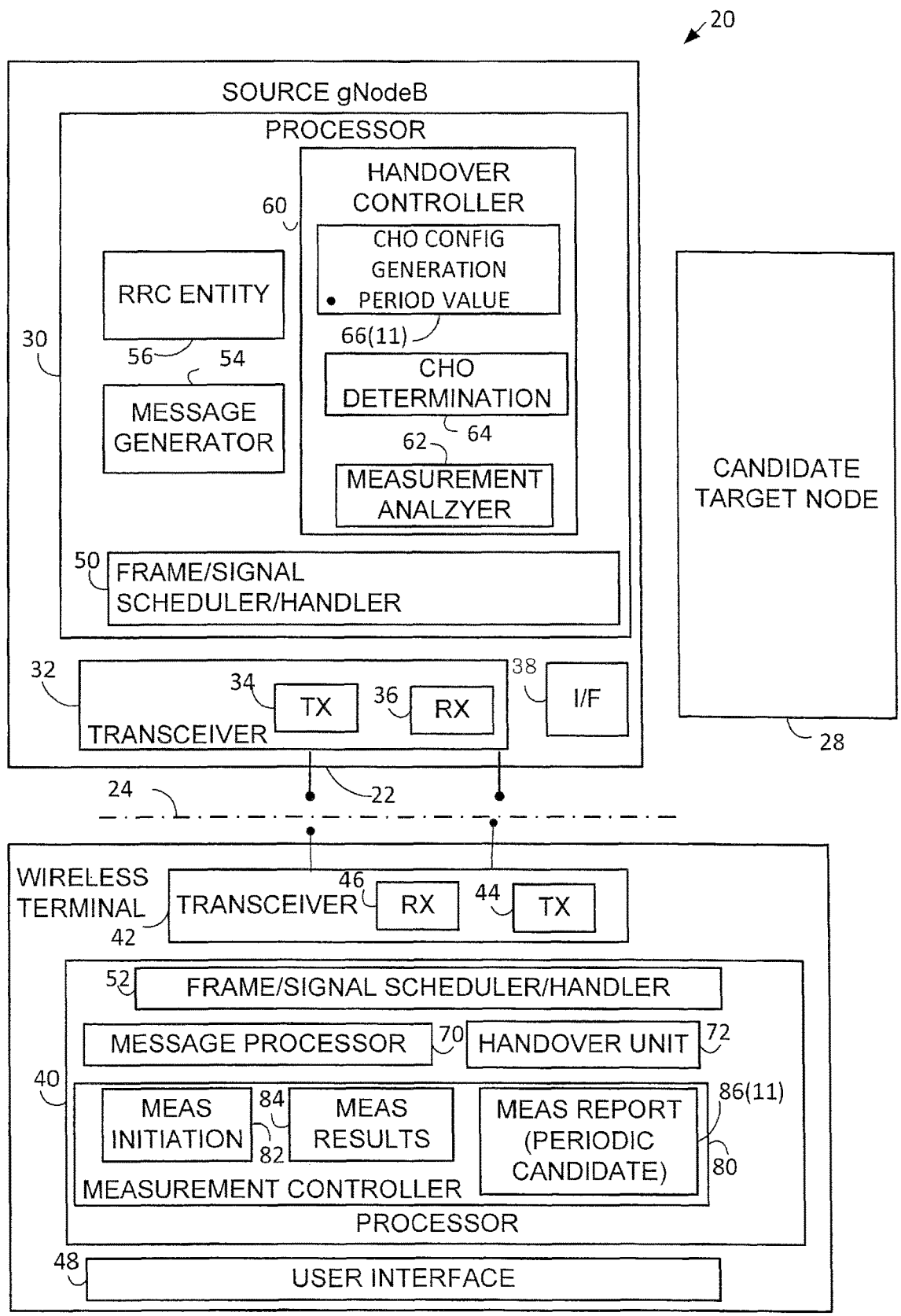
FIG. 11 is a schematic view of an example communications system comprising a source gNodeB which provides a wireless terminal with conditional handover configuration information which permits the wireless terminal to periodically report measurement results for a candidate target gNodeB(s).

In the example embodiment and mode of FIG. 11, the wireless terminal 26 may be permitted to periodically transmit a measurement report for the configured candidate target cell(s). One reason for permitting the wireless terminal 26 to transmit a measurement report on a periodic basis is that the source cell, the serving cell of source gNodeB 22, may use this measurement report to determine whether or not to release the CHO configuration. Since each of the candidate target cell(s), such as target gNodeB 28, reserves radio resources for a potential CHO, the radio access network may not desire to maintain the reserved resources forever. Therefore, the radio access network may force the 26 to continue reporting the measurement results of the candidate target cells.

The source gNodeB 22, wireless terminal 26, and node processor 30 of the communications system 20 of FIG. 11 are similar to those of FIG. 6, with like units and functionalities having like reference numbers. As shown in FIG. 11, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, and handover controller 60, with the handover controller 60 in turn comprising measurement analyzer 62, conditional handover (CHO) determination unit 64, and conditional handover configuration information generator 66(11). A difference between the example embodiment of FIG. 6 and the example embodiment and mode of FIG. 11 is that the conditional handover configuration information generator 66(11) includes in the conditional handover configuration information a conditional handover instruction which, rather than suppressing the reporting of measurements for candidate target gNodeBs, instead permits periodic reporting of the measurements for candidate target gNodeBs. The instruction of the conditional handover configuration information that permits the periodic reporting of the measurement results for the candidate target gNodeBs may be included in the "measurements instruction" information element, shown as the fourth information element of the conditional handover configuration message of FIG. 8, for example. Moreover, a value of the periodicity for the permitted reporting of the measurement results for the candidate target gNodeBs may be included in the "period value" information element, shown as the fifth information element of the conditional handover configuration message of FIG. 8, for example.

As in the FIG. 6 example embodiment and mode, the wireless terminal 26 of the example embodiment and mode of FIG. 11 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80, with the measurement controller 80 in turn comprising measurement initiation unit 82, measurement results unit 84, and measurement report control unit 86. Since, in the example embodiment and mode of FIG. 11, the wireless terminal 26 is permitted to periodically transmit the measurement results for a candidate target gNodeB, the measurement report control unit 86 of FIG. 11 is labeled for periodic candidate reporting.

Figure 12:
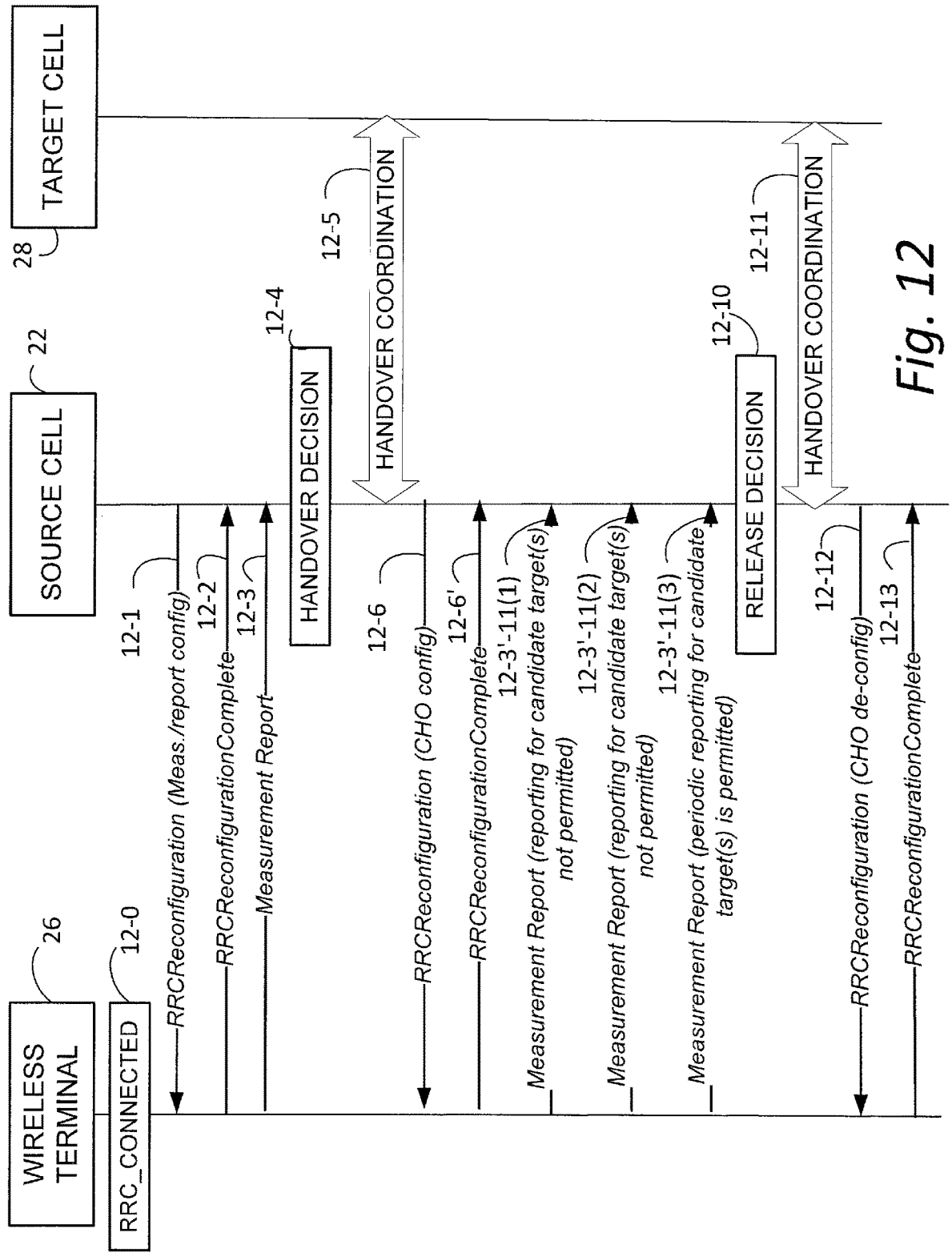
FIG. 12 is a diagrammatic view showing signaling and messages involved in measurement report in a conditional handover situation for the example cellular communications system of FIG. 11.

FIG. 12 illustrates an example scenario of the example embodiment and mode of FIG. 11, wherein after receiving the CHO configuration the wireless terminal 26 may periodically transmit the measurement report including the measurement results of some or all of the candidate target cell(s). The acts of FIG. 12 which are similar to those of FIG. 7 have similar suffixes, e.g., act 12-0 of FIG. 12 is similar to act 7-0 of FIG. 7, act 12-1 of FIG. 12 is similar to act 7-1 of FIG. 7, and so forth. A difference in the example embodiment and mode of FIG. 11 and FIG. 12 is that, after the conditional handover coordination of act 12-5, periodic reporting of measurement results for the candidate target gNodeB(s) is permitted. For example, FIG. 12 shows that the reporting of measurement results for the candidate target gNodeB(s) does not occur in the first two measurement reporting messages 12-3'-11(1) and 12-3'-11(2), but does occur in the third measurement reporting message 12-3'-11 (3).

In the example situation shown in FIG. 12, it may occur as a result of the third measurement reporting message 12-3'-11(3) that as act 12-10 the network, e.g., source gNodeB 22, determines that the conditional handover configuration, which resulted from the conditional handover decision of act 12-4, should be released. Such determination may be made by conditional handover (CHO) determination unit 64, for example. After the conditional handover release decision of act 12-10, as act 12-11 the source gNodeB 22 may engage in a handover release operation with target gNodeB 28, as reflected by act 12-11. In other words, as act 12-10 the source cell 22 may decide to release the CHO configuration, and in accordance with such decision may as act 12-11 negotiate with the candidate target cell(s), such as target gNodeB 28, to release the reserved resources. Thereafter as act 12-12 the source gNodeB 22 may send a conditional handover de-configuration message to the wireless terminal 26. Upon successful receipt of the conditional handover de-configuration message, as act 12-13 the wireless terminal 26 replies to source gNodeB 22 with a RRCReconfigurationComplete message.

Figure 13:
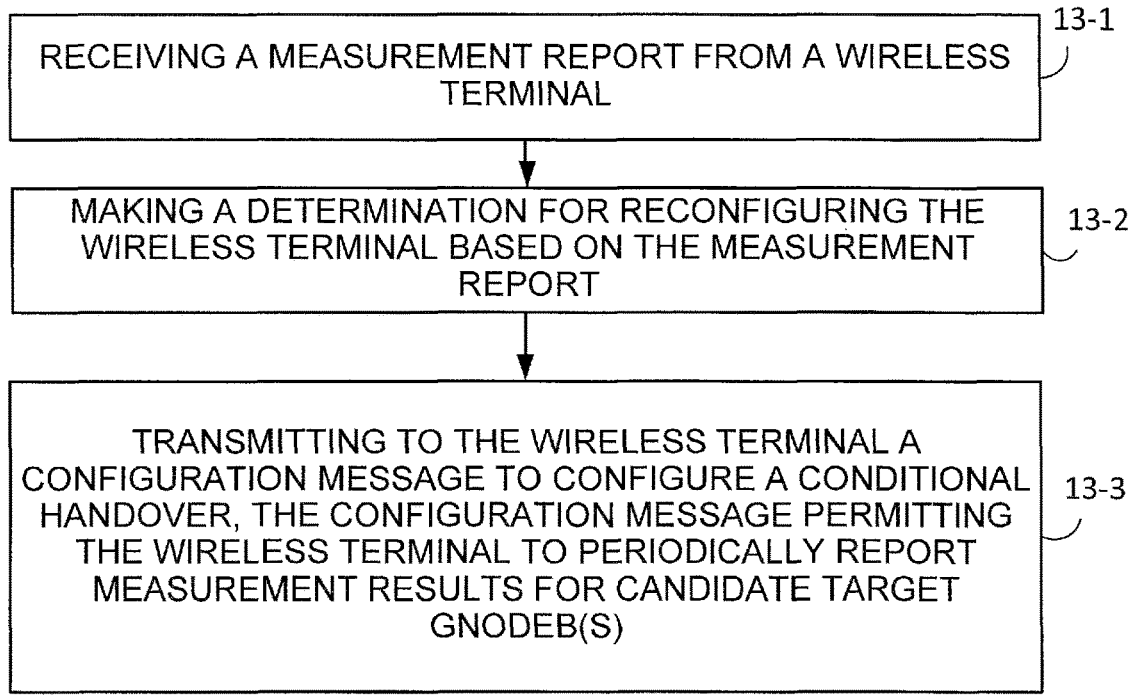
FIG. 13 is a flowchart showing example, basic, representative steps or acts performed by a source node of the system of FIG. 11.

The source gNodeB 22 of FIG. 11 thus permits the wireless terminal 26 to periodically report measurement results for the candidate target gNodeB(s). Example, representative, basic acts performed by source gNodeB 22 of FIG. 11 are shown in FIG. 13. Act 13-1 comprises receiving a measurement report from a wireless terminal. Act 13-2 comprises making a determination for reconfiguring the wireless terminal based on the measurement report. The determination of act 13-2 may be made by conditional handover (CHO) determination unit 64 of source gNodeB 22, and may further be reflected by act 12-4 of FIG. 12. Act 13-3 comprises transmitting to the wireless terminal a configuration message to configure a conditional handover, the configuration message being configured to permit periodic reporting of measurement results for a candidate target gNodeB(s).

Figure 14:
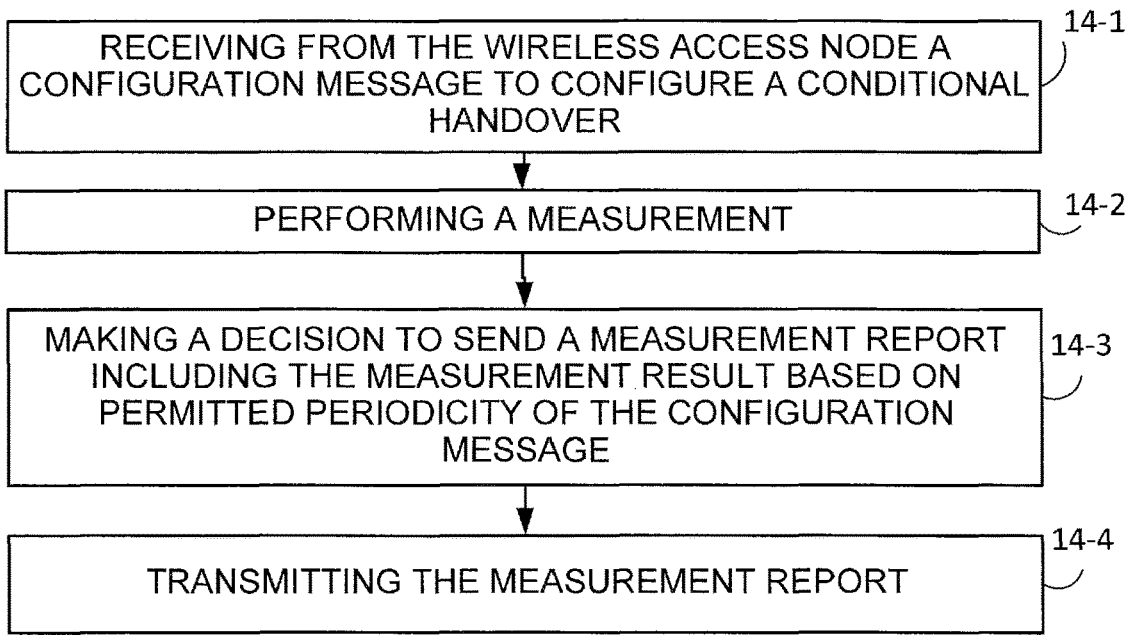
FIG. 14 is a flowchart showing example, basic, representative steps or acts performed by a wireless terminal of the system of FIG. 11.

Example, representative, basic acts performed by wireless terminal 26 of FIG. 11 are shown in FIG. 14. Act 14-1 comprises receiving from the wireless access node a configuration message to configure a conditional handover. The conditional handover configuration message of act 14-1 may be the message of act 12-6 as described above. Act 14-2 comprises the wireless terminal 26 performing a measurement. The measurement may be initiated by measurement initiation unit 82 of wireless terminal 26. Act 14-3 comprises the wireless terminal 26 making a decision, based on the configuration message of act 14-2 and permitted periodicity, to send a measurement report including the measurement result. Act 14-4 comprises transmitting the measurement report to source gNodeB 22.

In one example implementation, the CHO configuration may indicate if the wireless terminal 26 is required to transmit the measurement report for some or all of the candidate target cell(s), and the periodicity of the reporting. Listing 6 shows an example format of the CHO configuration based on Listing 4, where an optional field reportPeriodicity, configured separately from the reporting configuration, indicates the periodicity of the reporting of the concerned target cell(s). The presence of this optional field may indicate that the UE is forced to periodically transmit the measurement report, whereas the absence of this field may indicate that the UE should suppress the measurement report as disclosed in the first example embodiment and mode. The reportPeriodicity field may correspond to the period value information element shown in FIG. 8.

Listing 6

```
CHOConfig ::=                       SEQUENCE {
    CHOConfigToRemoveList           CHOConfigToRemoveList
OPTIONAL,    -- Need N
    CHOConfigToAddModList           CHOConfigToAddModList
OPTIONAL,    -- Need N
}
OPTIONAL,    -- Need M
CHOConfigToRemoveList ::= SEQUENCE (SIZE
(1..maxNrofCHOConfigId)) OF CHOConfigId
ReportConfigToAddModList ::= SEQUENCE (SIZE
(1..maxCHOConfigId)) OF CHOConfigToAddMod
CHOConfigToAddMod ::=               SEQUENCE {
    choConfigId                     CHOConfigId,
    reportConfig                    CHOICE {
        choConfigNR                 CHOConfigNR,
        ...,
        choConfigInterRAT   choConfigInterRAT
    }
}
CHOConfigNR ::=                     SEQUENCE {
    CHOConditionList                SEQUENCE (SIZE
(1..maxCHOConditionList)) OF CHOCondition
}
CHOCondition                        SEQUENCE {
    candidateCellIDList                         SEQUENCE (SIZE
(1..maxCandidateCellIDList)) OF PhysCellId eventTriggered
EventTriggerConfigCHO,
    ...,
    reportCGI                       ReportCGI
}
    spCellConfigCommon              ServingCellConfigCommon
OPTIONAL,    -- Need M
    newUE-Identity                  RNTI-Value,
    reportPeriodicity               ENUMERATED {ms50, ms100, ms150,
ms200, ms500, ms1000, ms2000, ms10000}
OPTIONAL,
    validity                        ENUMERATED {ms50, ms100, ms150,
ms200, ms500, ms1000, ms2000, ms10000},
    rach-ConfigDedicated            CHOICE {
        uplink                      RACH-ConfigDedicated,
        supplementaryUplink         RACH-ConfigDedicated
    }
OPTIONAL,-- Need N
}
EventTriggerConfigCHO::=            SEQUENCE {
    eventId                         CHOICE {
        eventA1                     SEQUENCE {
            a1-Threshold                MeasTriggerQuantity,
        },
        eventA2                     SEQUENCE {
            a2-Threshold                MeasTriggerQuantity,
        },
        eventA3                     SEQUENCE. {
            a3-Offset
MeasTriggerQuantityOffset,
        },
        eventA4                     SEQUENCE {
            a4-Threshold
MeasTriggerQuantity,
        },
        eventA5                     SEQUENCE {
            a5-Threshold1
```

---
Listing 6
---

```
MeasTriggerQuantity,
    a5-Threshold2
MeasTriggerQuantity,
    },
    eventA6                      SEQUENCE {
        a6-Offset
MeasTriggerQuantityOffset,
    },
    ...
},
...
```

Listing 7 is an example procedure of measurement report triggering, based on Listing 2 with revisions for supporting the present embodiment marked as bold text.

---
Listing 7
---

```
1>  for each measId included in the measIdList within
    VarMeasConfig:
  2>  if the corresponding reportConfig includes a
      reportType set to eventTriggered or periodical:
    3>  if the corresponding measObject concerns NR:
      4>  if the eventA1 or eventA2 is configured in the
          corresponding reportConfig:
        5>      consider only the serving cell to be applicable;
      4>  if the eventA3 or eventA5 is configured in the
          corresponding reportConfig:
        5>      if a serving cell is associated with a
                measObjectNR and neighbours are associated with
                another measObjectNR, consider any serving cell
                associated with the other measObjectNR to be a
                neighbouring cell as well;
      4>  for measurement events other than eventA1 or eventA2:
        5>      if useWhiteCellList is set to true:
          6>      consider any neighbouring cell detected based on
                  parameters in the associated measObjectNR to be
                  applicable when the concerned cell is included in
                  the whiteCellsToAddModList defined within the
                  VarMeasConfig for this measId;
        5>      else:
          6>      consider any neighbouring cell detected based on
                  parameters in the associated measObjectNR to be
                  applicable when the concerned cell is not
                  included in the blackCellsToAddModList defined
                  within the VarMeasConfig for this measId;
    3>  else if the corresponding measObject concerns E-UTRA:
      4>  consider any neighbouring cell detected on the
          associated frequency to be applicable when the
          concerned cell is not included in the
          blackCellsToAddModListEUTRAN defined within the
          VarMeasConfig for this measId;
  2>  else if the corresponding reportConfig includes a
      reportType set to reportCGI:
    3>      consider the cell detected on the associated
            measObject which has a physical cell identity matching
            the value of the cellForWhichToReportCGI included in
            the corresponding reportConfig within the VarMeasConfig
            to be applicable;
  2>  if the reportType is set to eventTriggered and if the
      entry condition applicable for this event, i.e. the event
      corresponding with the eventId of the corresponding
      reportConfig within VarMeasConfig, is fulfilled for one
      or more applicable cells for all measurements after layer
      3 filtering taken during timeToTrigger defined for this
      event within the VarMeasConfig, while the
      VarMeasReportList does not include a measurement
      reporting entry for this measId (a first cell triggers
      the event):
    3>      include a measurement reporting entry within the
            VarMeasReportList for this measId;
    3>      set the numberOfReportsSent defined within the
            VarMeasReportList for this measId to 0;
    3>      include the concerned cell(s) in the
            cellsTriggeredList defined within the VarMeasReportList
            for this measId;
    3>      initiate the measurement reporting procedure;
  2>  else if the reportType is set to eventTriggered and
      if the entry condition applicable for this event, i.e.
      the event corresponding with the eventId of the
      corresponding reportConfig within VarMeasConfig, is
      fulfilled for one or more applicable cells not included
      in the cellsTriggeredList for all measurements after
      layer 3 filtering taken during timeToTrigger defined for
      this event within the VarMeasConfig (a subsequent cell
      triggers the event):
    3>      set the numberOfReportsSent defined within the
            VarMeasReportList for this measId to 0;
    3>      include the concerned cell(s) in the
            cellsTriggeredList defined within the VarMeasReportList
            for this measId;
    4>      initiate the measurement reporting procedure;
  2>  else if the reportType is set to eventTriggered and
      if the leaving condition applicable for this event is
      fulfilled for one or more of the cells included in the
      cellsTriggeredList defined within the VarMeasReportList
      for this measId for all measurements after layer 3
      filtering taken during timeToTrigger defined within the
      VarMeasConfig for this event:
    3>      remove the concerned cell(s) in the
            cellsTriggeredList defined within the VarMeasReportList
            for this measId;
    3>      if reportOnLeave is set to true for the corresponding
            reporting configuration:
      4>      initiate the measurement reporting procedure;
    3>      if the cellsTriggeredList defined within the
            VarMeasReportList for this measId is empty:
      4>  remove the measurement reporting entry within the
          VarMeasReportList for this measId;
      4>  stop the periodical reporting timer for this measId,
          if running;
  2>  if reportType is set to periodical and if a (first)
      measurement result is available, or:
  2>  if a measurement result is available for one of the
      candidate target cell(s) configured by CHOConfig, and
      reportPeriodicity is included in CHOConfig:
    3>      include a measurement reporting entry within the
            VarMeasReportList for this measId;
    3>      set the numberOfReportsSent defined within the
            VarMeasReportList for this measId to 0;
    3>      if the reportAmount exceeds 1:
      4>      initiate the measurement reporting procedure, as
              specified in 5.5.5, immediately after the quantity to
              be reported becomes available for the NR SpCell;
    3>      else (i.e. the reportAmount is equal to 1):
      4>      initiate the measurement reporting procedure,
              immediately after the quantity to be reported becomes
              available for the NR SpCell and for the strongest
              cell among the applicable cells;
```

-continued

Listing 7

```
2> upon expiry of the periodical reporting timer for
    this measId, or:
2> upon expiry of reportPeriodicity included in
   CHOConfig:
   3>   initiate the measurement reporting procedure.
2> if reportType is set to reportCGI:
   3>   if the UE acquired the SIB1 or
   SystemInformationBlockType1 for the requested cell; or
   3>   if the UE detects that the requested NR cell is not
   transmitting SIB1 (see TS 38.213 [13], clause 13):
      4>   stop timer T321;
      4>   include a measurement reporting entry within the
           VarMeasReportList for this measId;
      4>   set the numberOfReportsSent defined within the
           VarMeasReportList for this measId to 0;
      4>   initiate the measurement reporting procedure;
2> upon the expiry of T321 for this measId:
   3>       include a measurement reporting entry within the
           VarMeasReportList for this measId;
   3>   set the numberOfReportsSent defined within the
           VarMeasReportList for this measId to 0;
   3>   initiate the measurement reporting procedure.
```

In another example implementation, the indication in the CHO configuration indicating if the wireless terminal 26 is required to transmit the measurement report for some or all of the candidate target cell(s) may be a Boolean type field (or a present/absence type field), associated with no designated periodicity. In this case, after receiving the CHO configuration, the wireless terminal may send a measurement report (even for candidate target cell(s)) in accordance with the reporting configuration in the pre-conditional measurement configuration if the Boolean type field is set to true (or false) (or the presence/absence type field is present (or absent)), otherwise, the wireless terminal may suppress measurement reports with regard to the candidate target cell(s) in accordance with the previous embodiment.

3: Leaving Condition for Conditional Handover Configuration

Figure 15:
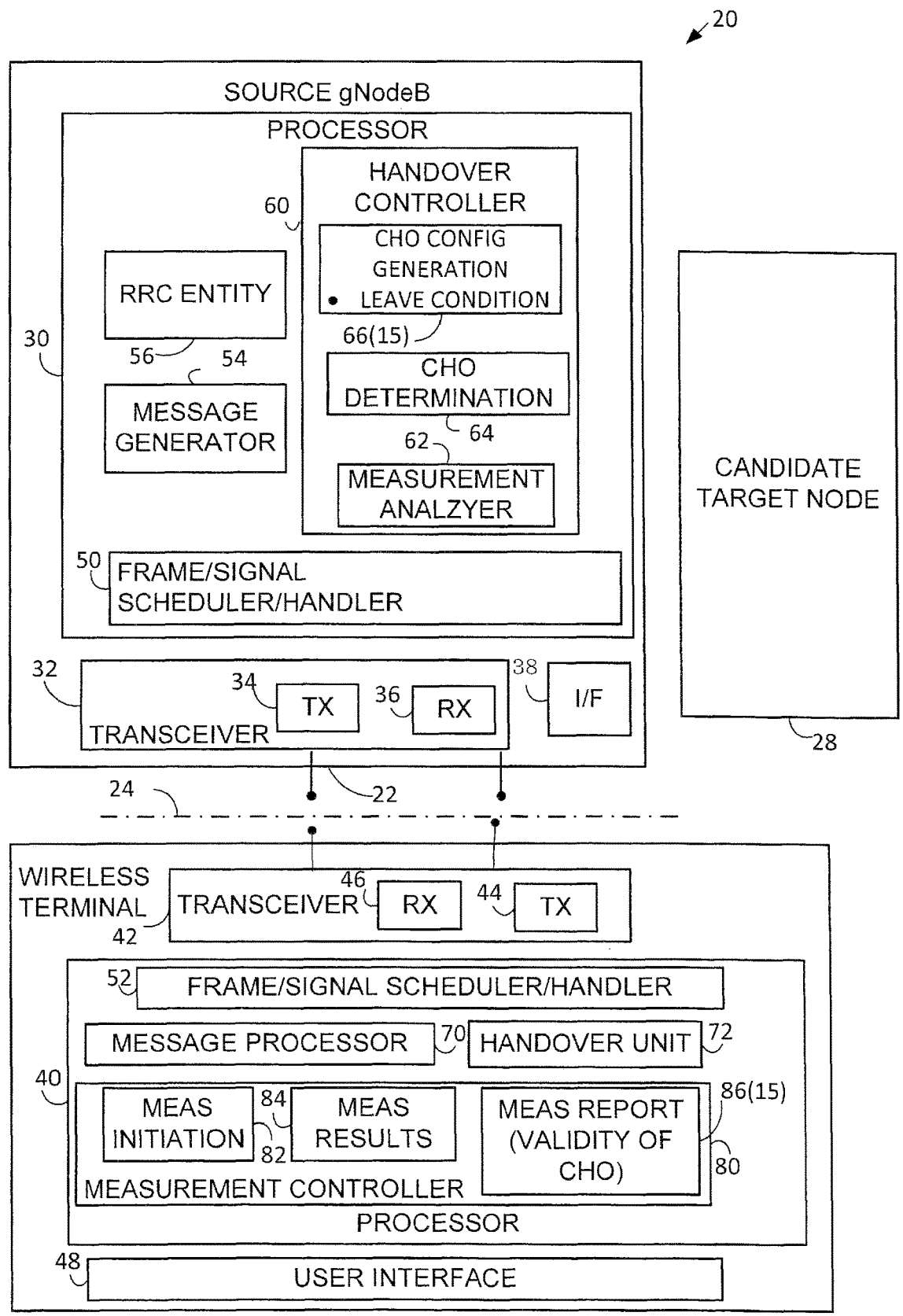
FIG. 15 is a schematic view of an example communications system comprising a source gNodeB which provides a wireless terminal with conditional handover configuration information which notifies the wireless terminal of conditions for leaving the conditional handover.

In the example embodiment and mode of FIG. 15, the source gNodeB 22 may provide the wireless terminal 26 with validity information, or conversely invalidity information, that informs the wireless terminal 26 of the validity or currency of the conditional handover configuration information that the wireless terminal 26 receives from the source gNodeB 22 One reason for providing the wireless terminal 26 with such (in)validity information is to preclude continued pendency of aged conditional handover configuration information, and/or to force the wireless terminal 26 to report measurement results for a candidate target gNodeB upon occurrence of one or more leave condition(s).

The source gNodeB 22, wireless terminal 26, and node processor 30 of the communications system 20 of FIG. 15 are similar to those of FIG. 6 and FIG. 11, with like units and functionalities having like reference numbers. As shown in FIG. 15, the source gNodeB 22 comprises node processor circuitry ("node processor 30") and node transceiver circuitry 32, with node transceiver circuitry 32 comprising node transmitter 34 and node receiver 36. The node processor 30 comprises node frame/signal scheduler/handler 50, message generator 54, RRC state machine 56, and handover controller 60, with the handover controller 60 in turn comprising measurement analyzer 62, conditional handover (CHO) determination unit 64, and conditional handover configuration information generator 66(11). A difference between the previous example embodiments and the example embodiment and mode of FIG. 15 is that the conditional handover configuration information generator 66(15) includes, in the conditional handover configuration information, (in)validity information, also known as "leave condition(s)", which may be used by wireless terminal 26 to assess how long the conditional handover condition is to be in effect or when the conditional handover condition is to be exited. By way of non-limiting example, the leaving conditions may be provided in the last illustrated information element, "leaving conditions", of the conditional handover configuration message of FIG. 8.

As in the preceding example embodiments and modes, the wireless terminal 26 of the example embodiment and mode of FIG. 15 comprises terminal processor 40 and terminal transceiver circuitry 42, with terminal transceiver circuitry 42 in turn comprising terminal transmitter 44 and terminal receiver 46. The terminal processor 40 comprises terminal frame/signal handler 52, message processor 70, handover unit 72, and measurement controller 80, with the measurement controller 80 in turn comprising measurement initiation unit 82, measurement results unit 84, and measurement report control unit 86. In the example embodiment and mode of FIG. 15, the wireless terminal 26 is provided with information which specifies the (in)validity of or leaving conditions for the conditional handover. Accordingly, the measurement report control unit 86(15) of FIG. 15 functions to determine, using the (in)validity information and/or leaving conditions, whether the measurement results for the candidate target gNodeB(s) are to be reported.

The example embodiment of FIG. 15 discloses validity of CHO configurations that wireless terminal 26 has previously received and associated reporting. In one example implementation, the validity of a CHO configuration may be valid until the wireless terminal 26 actually executes a handover. In another example implementation, the validity may terminate upon the source cell explicitly de-configuring the CHO configuration by sending a message to the UE (as in the example embodiment and mode of FIG. 11). In yet another example implementation, the validity may be managed by at least one timer. In this timer implementation, the wireless terminal 26 may release the CHO configuration at the expiry of the timer, while the radio network (the source/candidate target cells) may release the reserved radio resources at the expiry.

In the FIG. 15 example embodiment, de-configuring CHO configurations may be based on one or more leaving conditions. The leaving conditions may specify events upon which the UE leaves from the CHO configuration.

Figure 16:
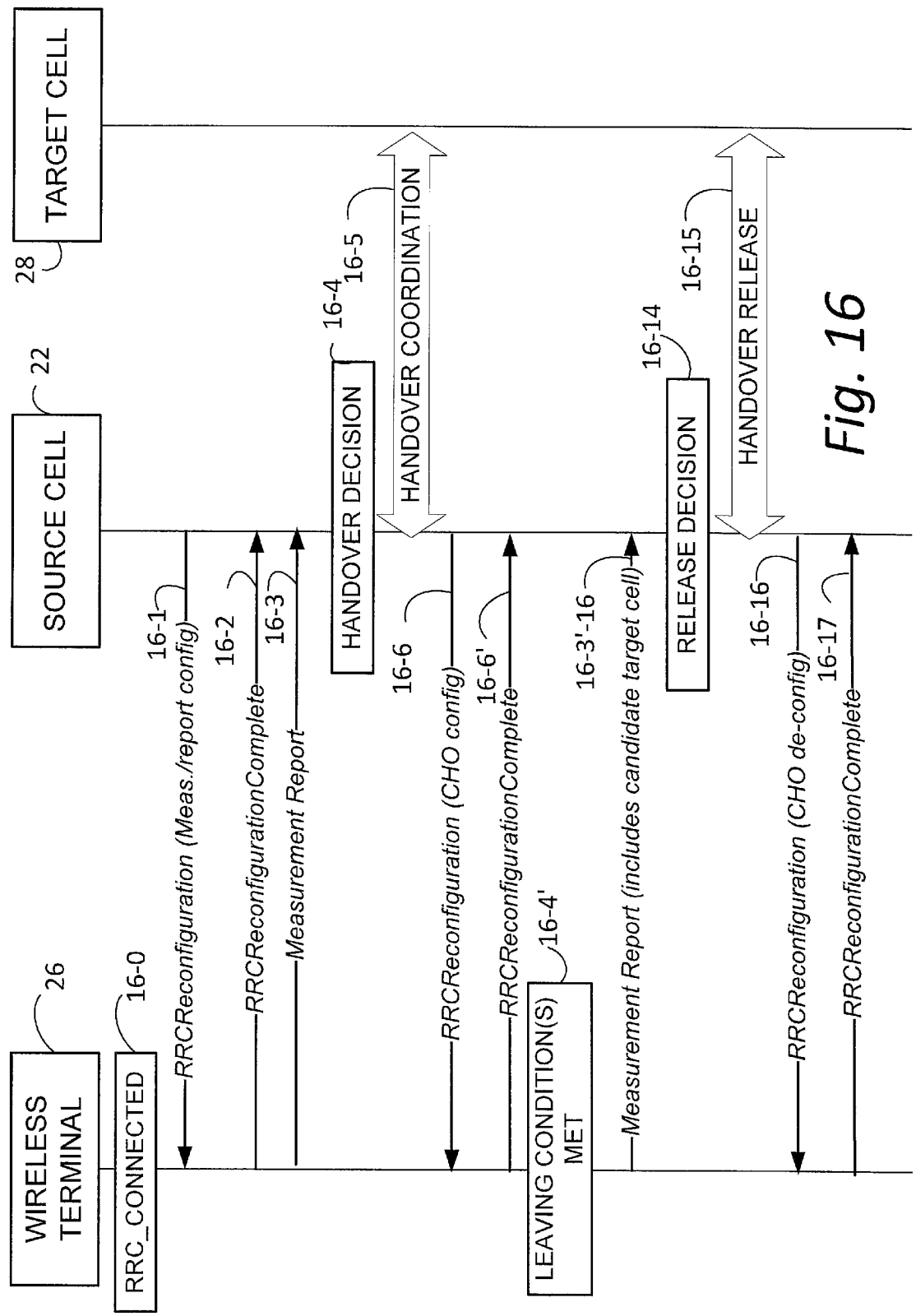
FIG. 16 is a diagrammatic view showing signaling and messages involved in measurement report in a conditional handover situation for the example cellular communications system of FIG. 15.

FIG. 16 illustrates an example scenario which may be performed by the system 20 of FIG. 15. In one example implementation shown in FIG. 16, the UE wireless terminal 26 use EventTriggeringConfig configured with MeasConfig. Accordingly, the UE may continue the measuring procedure based on the information element measIds in MeasConfig. For each measId, if the UE detects that one of the candidate target cell meets the leaving condition/event (e.g. measurement result<threshold−hysteresis) specified in the corresponding reportConfig, the wireless terminal 26 may send a measurement report including the measurement result of the candidate target cell, based on a flag reportOnLeave associated with the condition/event. The source cell may release the handover coordination with the candidate target cell and may further send a message for CHO de-configuration. This scenario is illustrated in FIG. 16.

The acts of FIG. 16 which are similar to those of FIG. 7 and FIG. 12, have similar suffixes, e.g., act 16-0 of FIG. 16 is similar to act 7-0 of FIG. 7, act 16-1 of FIG. 16 is similar to act 7-1 of FIG. 7, and so forth. A difference in the example embodiment and mode of FIG. 16 relative to previous example embodiments and modes is that, after the conditional handover coordination of act 16-5, the wireless terminal 26 continues to check if the invalidity or leave conditions specified in the conditional handover configuration information of message 16-5 is satisfied. If the invalidity or leave conditions specified in the conditional handover configuration information of message 16-5 are not satisfied, then the measurement report control unit 86 of wireless terminal 26 continues to suppress the measurement reporting of the measurement results of the candidate target eNode(s), in a manner similar to that of the example embodiment of FIG. 6 and FIG. 7. In other words, measurement reports such as those of act 7-3' of FIG. 6, which suppress the reporting of measurement results for the candidate target eNode(s), may be transmitted. However, in the example scenario of FIG. 16, as act 16-4' the wireless terminal 26 detects that the invalidity or leaving conditions specified in the conditional handover configuration information are met. Upon making the determination of act 16-4 that the invalidity or leaving conditions specified in the conditional handover configuration information are met by current conditions and/or events, thereafter the wireless terminal 26 sends measurement reports which include the candidate target cell, as reflected by act 16-3'-16. Based on the receipt of the unsuppressed measurement report of act 16-3'-16 or other information, as act 16-14 the source gNodeB 22 makes a decision to release the conditional handover. Accordingly, a conditional handover release procedure is performed between source gNodeB 22 and the target gNodeB 28, as shown by act 16-15. Thereafter as act 16-16 the source gNodeB 22 may send a conditional handover de-configuration message to the wireless terminal 26. Upon successful receipt of the conditional handover de-configuration message, as act 16-17 the wireless terminal 26 replies to source gNodeB 22 with a RRCReconfigurationComplete message.

Figure 17:
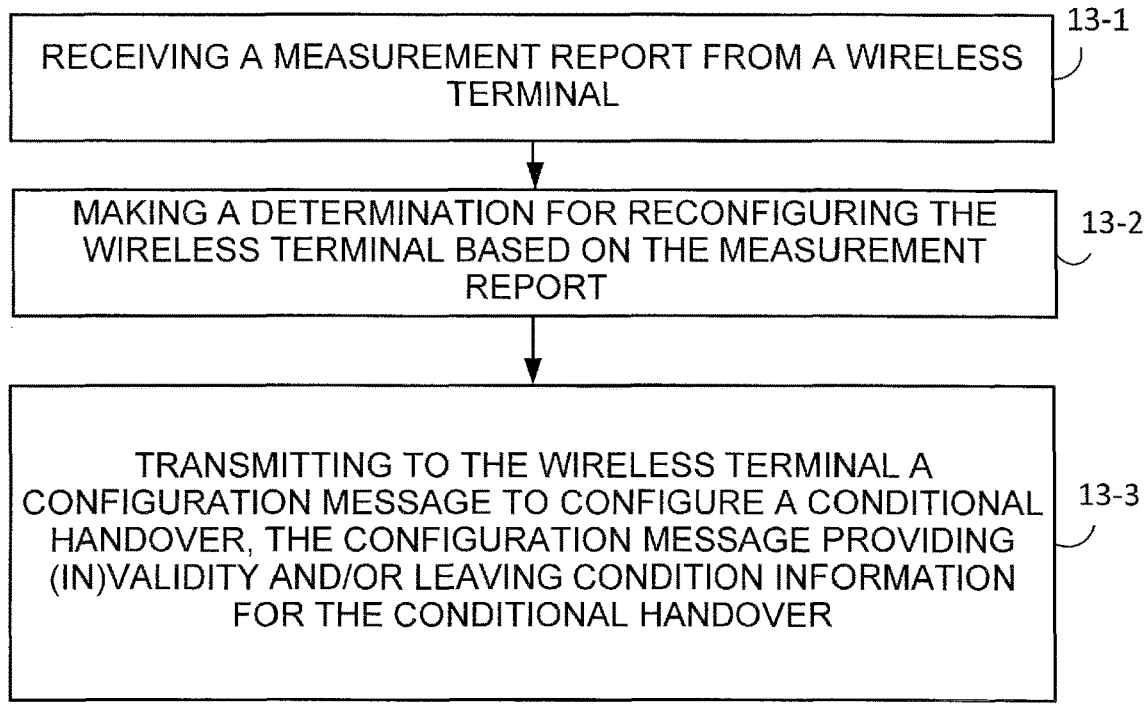
FIG. 17 is a flowchart showing example, basic, representative steps or acts performed by a source node of the system of FIG. 15.

The source gNodeB 22 of FIG. 15 thus provides the wireless terminal 26 with certain (in)validity information or leaving condition information to apprise the wireless terminal 26 how long reports of measurement results for the candidate target gNodeB(s) should be suppressed, if the report suppression is configured as described in the previous embodiment. Example, representative, basic acts performed by source gNodeB 22 of FIG. 15 are shown in FIG. 17. Act 17-1 comprises receiving a measurement report from a wireless terminal. Act 17-2 comprises making a determination for reconfiguring the wireless terminal based on the measurement report. The determination of act 17-2 may be made by conditional handover (CHO) determination unit 64 of source gNodeB 22, and may further be reflected by act 16-4 of FIG. 16. Act 17-3 comprises transmitting to the wireless terminal a configuration message to configure a conditional handover, the configuration message being configured to provide (in)validity or leaving condition information for a conditional handover.

Figure 18:
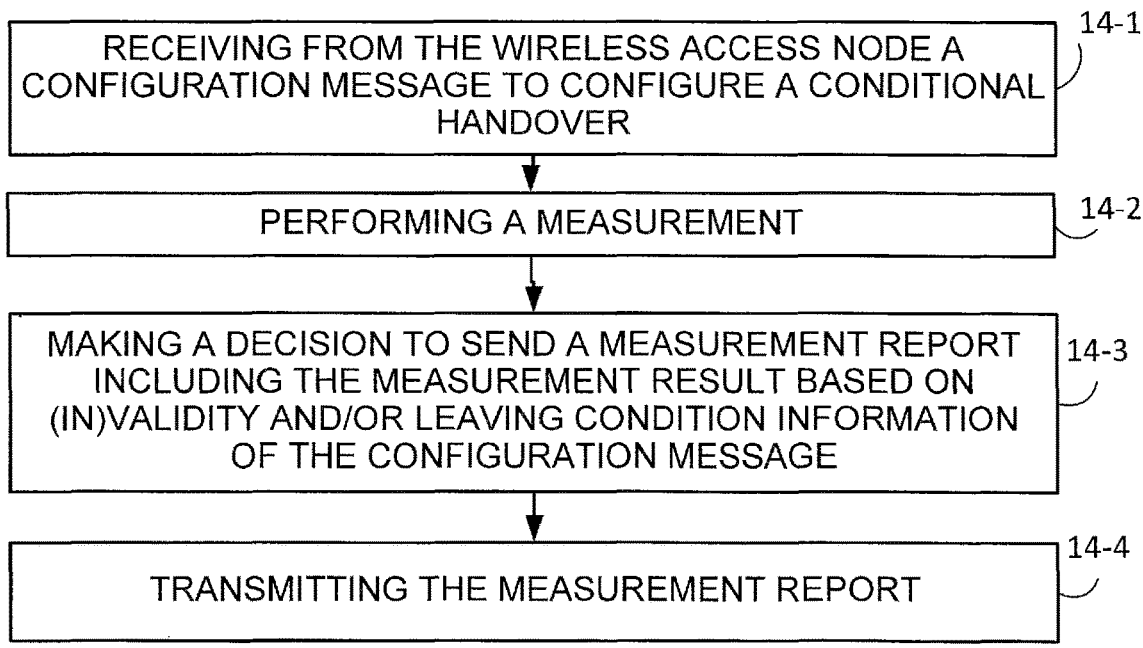
FIG. 18 is a flowchart showing example, basic, representative steps or acts performed by a wireless terminal of the system of FIG. 15.

Example, representative, basic acts performed by wireless terminal 26 of FIG. 15 are shown in FIG. 18. Act 18-1 comprises receiving from the wireless access node a configuration message to configure a conditional handover. The conditional handover configuration message of act 18-1 may be the message of act 16-6 as described above. Act 18-2 comprises the wireless terminal 26 performing a measurement. The measurement may be initiated by measurement initiation unit 82 of wireless terminal 26. Act 18-3 comprises the wireless terminal 26 making a decision, based on the configuration message of act 14-2 and the (in)validity and/or leaving condition information, whether to send a measurement report including the measurement result for a candidate target gNodeB(s). Act 18-4 comprises transmitting the measurement report to source gNodeB 22.

In another example implementation, the CHO configuration may include one or more leaving condition(s), separately from the condition(s) configured in MeasConfig. For example, the CHO configuration may include leaving offset(s) for each condition/event as shown in Listing 8. The wireless terminal 26 may consider that the leaving condition is met when the measurement result of the concerned candidate target cell goes below ax_Threshold-ax_LeavingOffset, where ax is one of A1, A2, A3, A4, A5 and A6 or any other events (not specified). Similar to the previous implementation, each condition may be associated with reportOnLeave, instructing the UE whether to transmit a measurement report when the leaving condition is met.

Listing 8

```
CHOConfig ::=                    SEQUENCE {
    CHOConfigToRemoveList        CHOConfigToRemoveList
OPTIONAL,    -- Need N
    CHOConfigToAddModList        CHOConfigToAddModList
OPTIONAL,    -- Need N
    }
OPTIONAL,    -- Need M
CHOConfigToRemoveList ::=    SEQUENCE (SIZE
(1..maxNrofCHOConfigId)) OF CHOConfigId
ReportConfigToAddModList ::= SEQUENCE (SIZE
(1..maxCHOConfigId)) OF CHOConfigToAddMod
CHOConfigToAddMod ::=            SEQUENCE {
    choConfigId                  CHOConfigId,
    reportConfig                 CHOICE {
        choConfigNR              CHOConfigNR,
        ...,
        choConfigInterRAT            choConfigInterRAT
    }
}
CHOConfigNR ::=                  SEQUENCE {
    CHOConditionList             SEQUENCE (SIZE
(1..maxCHOConditionList)) OF CHOCondition
}
CHOCondition                     SEQUENCE {
    candidateCellIDList          SEQUENCE (SIZE
(1..maxCandidateCellIDList)) OF PhysCellId eventTriggered
```

Listing 8

```
EventTriggerConfigCHO,
    ...,
    reportCGI            ReportCGI
}
spCellConfigCommon       ServingCellConfigCommon          OPTIONAL,   -- Need M
newUE-Identity           RNTI-Value,
reportPeriodicity        ENUMERATED {ms50, ms100, ms150, ms200, ms500, ms1000, ms2000, ms10000} OPTIONAL,
validity                 ENUMERATED {ms50, ms100, ms150, ms200, ms500, ms1000, ms2000, ms10000},
rach-ConfigDedicated     CHOICE {
    uplink                   RACH-ConfigDedicated,
    supplementaryUplink      RACH-ConfigDedicated
}                        OPTIONAL,   -- Need N
}
EventTriggerConfigCHO::=     SEQUENCE {
    eventId                  CHOICE {
        eventA1                  SEQUENCE {
            a1-Threshold             MeasTriggerQuantity,
            a1-LeavingOffset         MeasTriggerQuantityOffset       OPTIONAL,
            reportOnLeave            BOOLEAN              OPTIONAL,
        },
        eventA2                  SEQUENCE {
            a2-Threshold             MeasTriggerQuantity,
            a2-LeavingOffset    MeasTriggerQuantityOffset       OPTIONAL,
            reportOnLeave            BOOLEAN              OPTIONAL,
        },
        eventA3                  SEQUENCE {
            a3-Offset                MeasTriggerQuantityOffset,
            a3-LeavingOffset    MeasTriggerQuantityOffset       OPTIONAL,
            reportOnLeave                                  BOOLEAN           OPTIONAL,
        },
        eventA4                  SEQUENCE {
            a4-Threshold             MeasTriggerQuantity,
            a4-LeavingOffset    MeasTriggerQuantityOffset       OPTIONAL,
            reportOnLeave            BOOLEAN              OPTIONAL,
        },
        eventA5                  SEQUENCE {
            a5-Threshold1            MeasTriggerQuantity,
            a5-Threshold2            MeasTriggerQuantity,
            a5-LeavingOffset1   MeasTriggerQuantityOffset       OPTIONAL,
            a5-LeavingOffset2   MeasTriggerQuantityOffset       OPTIONAL,
            reportOnLeave            BOOLEAN              OPTIONAL,
        },
        eventA6                  SEQUENCE {
            a6-Offset                MeasTriggerQuantityOffset,
            a6-LeavingOffset    MeasTriggerQuantityOffset       OPTIONAL,
            reportOnLeave            BOOLEAN              OPTIONAL,
        },
        ...
    },
    ...
```

The technology disclosed herein thus proposes, e.g., methods and apparatus for a UE to handle measurement reports associated with conditional handover configurations. Specifically:

The UE may suppress measurement reports for cells configured as candidate target cells for conditional handovers. The suppression may be configured by the gNB of the serving cell.

The UE may continue measurement reports in a periodic manner for cells configured as candidate target cells for conditional handovers. The periodicity may be configured by the gNB of the serving cell.

The gNB may configure the UE with leaving condition(s) associated with conditional handover configurations. The UE may discard the conditional handover configurations when some of the leaving condition(s) is/are met.

Figure 19:
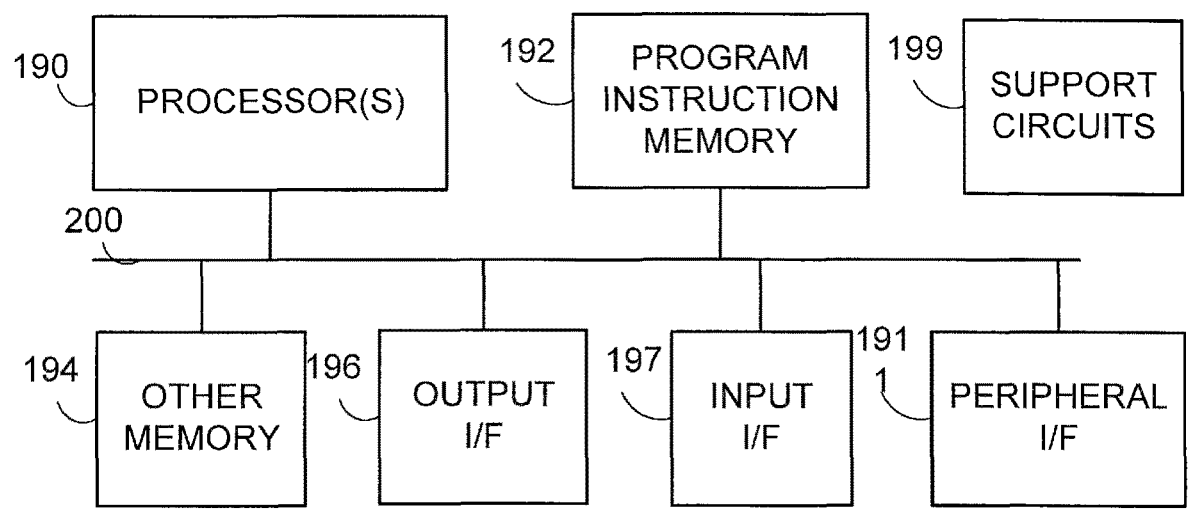
FIG. 19 is a diagrammatic view showing example elements comprising electronic machinery which may comprise a wireless terminal, a radio access node, and a core network node according to an example embodiment and mode.

Certain units and functionalities of the systems 20 may be implemented by electronic machinery. For example, electronic machinery may refer to the processor circuitry described herein, such as node processor(s) 30, and terminal processor(s) 40. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 19 shows an example of electronic machinery, e.g., processor circuitry, as comprising one or more processors 190, program instruction memory 192; other memory 194 (e.g., RAM, cache, etc.); input/output interfaces 196 and 197, peripheral interfaces 198; support circuits 199; and busses 200 for communication between the aforementioned units. The processor(s) 190 may comprise the processor circuitries described herein, for example, node processor(s) 30 and terminal processor(s) 40.

An memory or register described herein may be depicted by memory 194, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 199 are coupled to the processors 190 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the node processor 30 and terminal processor 40 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The technologies of the various example embodiments and modes described herein may be implemented either singly or in combination with one another. For example, one or more features of the example embodiment and mode of FIG. 6, one or more features of the example embodiment and mode of FIG. 11, and one or more features of the example embodiment and mode of FIG. 15 may be combined for use with one or more of each other.

It will be appreciated that the technology disclosed herein is directed to solving radio communications-centric issues and is necessarily rooted in computer technology and overcomes problems specifically arising in radio communications. Moreover, the technology disclosed herein improves basic function of a measurement reporting in a situation of a conditional handover, e.g., methods and procedures to deal with problematic issues such as governing or controlling for which candidate target gNodeB(s) measurement results should be reported, in order to operate the network 20 effectively and to reduce congestion in such operation.

The technology disclosed herein encompasses one or more of the following nonlimiting, non-exclusive example embodiments and modes: Example Embodiment 1: A wireless terminal that communicates over a radio interface with a wireless access node of a radio access network (RAN), the wireless terminal comprising: receiver circuitry configured to receive from the wireless access node a configuration message to configure a conditional handover; processor circuitry configured to perform a measurement, to generate a measurement result, and to make a decision to send a measurement report including the measurement result, and transmitter circuitry configured to transmit the measurement report; wherein: the configuration message comprises one or more identities of candidate target cell(s) and one or more conditions to perform a handover autonomously, and; the decision to send the measurement report is based on the configuration message.

Example Embodiment 2: The wireless terminal of Example Embodiment 1, wherein the configuration message instructs the wireless terminal to send a measurement report in a case that the measurement report includes the measurement result for cells other than the candidate target cell(s).

Example Embodiment 3: The wireless terminal of Example Embodiment 1, wherein configuration message instructs the wireless terminal not to send the measurement report for the candidate target cell(s).

Example Embodiment 4: The wireless terminal of Example Embodiment 1, wherein configuration message instructs the wireless terminal to periodically send the measurement report for the candidate target cell(s).

Example Embodiment 5: The wireless terminal of Example Embodiment 4, wherein the configuration message includes an indication indicating whether or not to periodically send the measurement report for the candidate target cell(s).

Example Embodiment 6: The wireless terminal of Example Embodiment 4, wherein the configuration message includes at least one period value designated for use of periodic measurement reporting with regard to the candidate target cell(s).

Example Embodiment 7: The wireless terminal of Example Embodiment 1, wherein the configuration message includes at least one leaving condition, the leaving condition being used to release the one or more conditions to perform a handover autonomously.

Example Embodiment 8: The wireless terminal of Example Embodiment 7, wherein the configuration message instructs the wireless terminal to send the measurement report in a case that some of the at least one leaving condition is met.

Example Embodiment 9: The wireless terminal of Example Embodiment 7, wherein the configuration message includes an indication associated with one of the at least one leaving condition, the indication indicating whether or not to send the measurement report in a case the leaving condition is met.

Example Embodiment 10: A method for a wireless terminal that communicates over a radio interface with a wireless access node of a radio access network (RAN), the method comprising: receiving from the wireless access node a configuration message to configure a conditional handover; performing a measurement; generating a measurement result; making a decision to send a measurement report including the measurement result, and; transmitting the measurement report; wherein: the configuration message comprises one or more identities of candidate target cell(s) and one or more conditions to perform a handover autonomously, and; the decision to send the measurement report is based on the configuration message.

Example Embodiment 11: The method of Example Embodiment 10, wherein the configuration message instructs the wireless terminal to send the measurement report in a case that the measurement report includes measurement results for cells other than the candidate target cell(s).

Example Embodiment 12: The method of Example Embodiment 10, wherein configuration message instructs the wireless terminal not to send the measurement report for the candidate target cell(s).

Example Embodiment 13: The method of Example Embodiment 10, wherein configuration message instructs the wireless terminal to periodically send the measurement report for the candidate target cell(s).

Example Embodiment 14: The method of Example Embodiment 13, wherein the configuration message includes an indication indicating whether or not to periodically send the measurement report for the candidate target cell(s).

Example Embodiment 15: The method of Example Embodiment 13, wherein the configuration message includes at least one period value designated for use of periodic measurement reporting with regard to the candidate target cell(s).

Example Embodiment 16: The method of Example Embodiment 10, wherein the configuration message includes at least one leaving condition, the leaving condition being used to release the one or more conditions to perform a handover autonomously.

Example Embodiment 17: The method of Example Embodiment 16, wherein the configuration message instructs the wireless terminal to send the measurement report in a case that some of the at least one leaving condition is met.

Example Embodiment 18: The method of Example Embodiment 16, wherein the configuration message includes an indication associated with one of the at least one leaving condition, the indication indicating whether or not to send the measurement report in a case the leaving condition is met.

Example Embodiment 19: An access node of a radio access network (RAN), the access node comprising: transmitter circuitry configured to transmit to a wireless terminal a configuration message to configure a conditional handover; receiver circuitry configured to receive a measurement report from the wireless terminal; processor circuitry configured to make a determination for reconfiguring the wireless terminal based on the measurement report; wherein: the configuration message comprises one or more identities of candidate target cell(s) and one or more conditions to perform a handover autonomously, and; the decision for the wireless terminal to send the measurement report is based on the configuration message.

Example Embodiment 20: The access node of Example Embodiment 19, wherein the configuration message instructs the wireless terminal to send the measurement report in a case that the measurement report includes measurement results for cells other than the candidate target cell(s).

Example Embodiment 21: The access node of Example Embodiment 19, wherein configuration message instructs the wireless terminal not to send the measurement report for the candidate target cell(s).

Example Embodiment 22: The access node of Example Embodiment 19, wherein configuration message instructs the wireless terminal to periodically send the measurement report for the candidate target cell(s).

Example Embodiment 23: The access node of Example Embodiment 22, wherein the configuration message includes an indication indicating whether or not to periodically send the measurement report for the candidate target cell(s).

Example Embodiment 24: The access node of Example Embodiment 22, wherein the configuration message includes at least one period value designated for use of periodic measurement reporting with regard to the candidate target cell(s).

Example Embodiment 25: The access node of Example Embodiment 19, wherein the configuration message includes at least one leaving condition, the leaving condition being used to release the one or more conditions to perform a handover autonomously.

Example Embodiment 26: The access node of Example Embodiment 25, wherein the configuration message instructs the wireless terminal to send the measurement report in a case that some of the at least one leaving condition is met.

Example Embodiment 27: The access node of Example Embodiment 25, wherein the configuration message includes an indication associated with one of the at least one leaving condition, the indication indicating whether or not to send the measurement report in a case the leaving condition is met.

Example Embodiment 28: A method for an access node of a radio access network (RAN), the method comprising: receiving a measurement report from the wireless terminal; making a determination for reconfiguring the wireless terminal based on the measurement report; transmitting to a wireless terminal a configuration message to configure a conditional handover; wherein: the configuration message comprises one or more identities of candidate target cell(s) and one or more conditions to perform a handover autonomously, and; the decision for the wireless terminal to send the measurement report is based on the configuration message.

Example Embodiment 29: The method of Example Embodiment 28, wherein the configuration message instructs the wireless terminal to send the measurement report in a case that the measurement report includes measurement results for cells other than the candidate target cell(s).

Example Embodiment 30: The method of Example Embodiment 28, wherein configuration message instructs the wireless terminal not to send the measurement report for the candidate target cell(s).

Example Embodiment 31: The method of Example Embodiment 28, wherein configuration message instructs the wireless terminal to periodically send the measurement report for the candidate target cell(s).

Example Embodiment 32: The method of Example Embodiment 31, wherein the configuration message includes an indication indicating whether or not to periodically send the measurement report for the candidate target cell(s).

Example Embodiment 33: The method of Example Embodiment 31, wherein the configuration message includes at least one period value designated for use of periodic measurement reporting with regard to the candidate target cell(s).

Example Embodiment 34: The method of Example Embodiment 28, wherein the configuration message includes at least one leaving condition, the leaving condition being used to release the one or more conditions to perform a handover autonomously.

Example Embodiment 35: The method of Example Embodiment 34, wherein the configuration message instructs the wireless terminal to send the measurement report in a case that some of the at least one leaving condition is met.

Example Embodiment 36: The method of Example Embodiment 34, wherein the configuration message includes an indication associated with one of the at least one leaving condition, the indication indicating whether or not to send the measurement report in a case the leaving condition is met.

Example Embodiment 37: A wireless terminal that communicates over a radio interface with a wireless access node of a radio access network (RAN), the wireless terminal comprising: receiver circuitry configured to receive from the wireless access node at least one reconfiguration message comprising a measurement object, a trigger configuration for a conditional handover and an identity of a candidate target cell; processor circuitry configured to: perform a measurement based on the measurement object, and; decide, based on the measurement and the trigger configuration, whether or not to execute the conditional handover to the candidate target cell; wherein: the trigger configuration does not include a measurement report configuration.

Example Embodiment 38: The wireless terminal of Example Embodiment 37, wherein the at least one reconfiguration message instructs the wireless terminal not to send a measurement report for the candidate target cell.

Example Embodiment 39: The wireless terminal of Example Embodiment 37, wherein the trigger configuration comprises one or more events, each of the one or more events comprising at least one offset/threshold value.

Example Embodiment 40: The wireless terminal of Example Embodiment 37, wherein the measurement report configuration comprises at least any one of a report interval, a report amount and a maximum number of cells to report.

Example Embodiment 41: A method for a wireless terminal that communicates over a radio interface with a wireless access node of a radio access network (RAN), the method comprising: receiving from the wireless access node at least one reconfiguration message comprising a measurement object, a trigger configuration for a conditional handover and an identity of a candidate target cell; performing a measurement based on the measurement object, and; deciding, based on the measurement and the trigger configuration, whether or not to execute the conditional handover to the candidate target cell; wherein: the trigger configuration does not include a measurement report configuration.

Example Embodiment 42: The method of Example Embodiment 41, wherein the at least one reconfiguration message instructs the wireless terminal not to send a measurement report for the candidate target cell.

Example Embodiment 43: The method of Example Embodiment 41, wherein the triggering condition comprises one or more events, each of the one or more events comprising at least one offset/threshold value.

Example Embodiment 44: The method of Example Embodiment 41, wherein the measurement report configuration comprises at least any one of a report interval, a report amount and a maximum number of cells to report.

Example Embodiment 45: An access node of a radio access network (RAN), the access node comprising: processor circuitry configured to generate at least one reconfiguration message comprising a measurement object, a trigger configuration for a conditional handover and an identity of a candidate target cell; transmitter circuitry configured to transmit the at least one reconfiguration message; wherein: the trigger configuration does not include a measurement report configuration.

Example Embodiment 46: The access node of Example Embodiment 45, wherein the at least one reconfiguration message instructs the wireless terminal not to send a measurement report for the candidate target cell.

Example Embodiment 47: The access node of Example Embodiment 45, wherein the trigger configuration comprises one or more events, each of the one or more events comprising at least one offset/threshold value.

Example Embodiment 48: The access node of Example Embodiment 45, wherein the measurement report configuration comprises at least any one of a report interval, a report amount and a maximum number of cells to report.

Example Embodiment 49: A method for an access node of a radio access network (RAN), the method comprising: generating at least one reconfiguration message comprising a measurement object, a trigger configuration for a conditional handover and an identity of a candidate target cell, and; transmitting the at least one reconfiguration message; wherein: the trigger configuration does not include a measurement report configuration.

Example Embodiment 50: The method of Example Embodiment 49, wherein the at least one reconfiguration message instructs the wireless terminal not to send a measurement report for the candidate target cell.

Example Embodiment 51: The method of Example Embodiment 49, wherein the trigger configuration comprises one or more events, each of the one or more events comprising at least one offset/threshold value.

Example Embodiment 52: The method of Example Embodiment 49, wherein the measurement report configuration comprises at least any one of a report interval, a report amount and a maximum number of cells to report.

One or more of the following documents may be pertinent to the technology disclosed herein (all of which are incorporated herein by reference in their entirety):

3GPP RAN2 #105bis Contributions:

| | |
|---|---|
| R2-1903243 | Conditional Handover in High Frequency MediaTek Inc. |
| R2-1903244 | Mobility Failure Recovery in NR MediaTek Inc. |
| R2-1903305 | Discussion on failure handling of handover for NR mobility OPPO |
| R2-1903309 | Further details on conditional handover for NR Mobility Enhancements OPPO |
| R2-1903354 | Consideration on the UE capability of supporting CHO CATT |
| R2-1903355 | Open Issues of Conditional Handover in NR CATT |
| R2-1903356 | Handling of Conditional Handover Failure in NR CATT |
| R2-1903357 | Aspects for consideration in support of multiple cells in CHO CATT |
| R2-1903436 | Triggers for conditional handover vivo |
| R2-1903438 | Fast handover failure recovery in NR vivo |
| R2-1903450 | Report of the email discussion [105#58] on comparison of LTE and NR Conditional handover Intel Corporation |
| R2-1903451 | Further consideration on conditional handover Intel Corporation |
| R2-1903452 | Performance evaluation on exit condition for conditional handover Intel Corporation |
| R2-1903514 | Stage-2 aspects of conditional handover Ericsson |
| R2-1903515 | User plane aspects of conditional handover Ericsson |
| R2-1903516 | Configuration of conditional handover Ericsson |
| R2-1903517 | Triggering of conditional handover Ericsson |
| R2-1903518 | Execution of conditional handover Ericsson |
| R2-1903519 | Deconfiguration of conditional handover Ericsson |
| R2-1903520 | Conditional handover failures in NR Ericsson |
| R2-1903521 | Suspend while monitoring CHO Ericsson |
| R2-1903522 | Security implications of CHO Ericsson |
| R2-1903523 | On FR2 impact on CHO Ericsson |
| R2-1903524 | TP to 38.300 on Conditional Handover in NR Ericsson |
| R2-1903525 | Conditional handover performanceEricsson |
| R2-1903526 | Validity timer impact on conditional handover performance Ericsson |
| R2-1903527 | Comparison of solutions for handover robustness Ericsson |
| R2-1903528 | Draft LS on Data forwarding for conditional handover Ericsson |
| R2-1903529 | Fast RLF triggering based on timer T312 Ericsson |
| R2-1903530 | Fast handover failure recovery Ericsson |
| R2-1903531 | Repetition of RRC messages Ericsson |
| R2-1903560 | Triggers for Conditional Handover in NR InterDigital |
| R2-1903561 | Details of Conditional Handover Procedure for NR InterDigital |
| R2-1903567 | Discussion on CHO solution in NR Huawei, HiSilicon |
| R2-1903568 | Discussion on duplication during handover procedure Huawei, HiSilicon |
| R2-1903569 | Consideration on fast HO failure recovery Huawei, HiSilicon |
| R2-1903613 | Enhancement on Highly Frequent HO Scenario Apple |
| R2-1903651 | Conditional HO to improve mobility robustness Qualcomm Incorporated |
| R2-1903675 | Discussion on Conditional HO in NR China Telecom |
| R2-1903768 | Open issues for multiple candidate cells in conditional handover in NR SHARP Corporation |
| R2-1903791 | Measurement report enhancement in conditional handover Spreadtrum Communications |
| R2-1903907 | Service Interruption in Conditional Handover ETRI |
| R2-1903908 | Signalling Overhead Reduction for Conditional Handover ETRI |
| R2-1903909 | Faster Handover Failure Recovery ETRI |
| R2-1904069 | Reuse of conditional handover for SCG change in NR-DC NEC |
| R2-1904171 | Conditional handover for NR Lenovo, Motorola Mobility |
| R2-1904289 | Considerations for failure recovery in NR Nokia, Nokia Shanghai Bell |
| R2-1904290 | Beam selection and consolidation enhancements Nokia, Nokia Shanghai Bell |

| | |
|---|---|
| R2-1904294 | CFRA resources update for Conditional HO Nokia, Nokia Shanghai Bell |
| R2-1904295 | Robustness through SRB duplication for split bearer solution in NR Nokia, Nokia Shanghai Bell |
| R2-1904344 | Consideration of Beamforming for NR Conditional Handover CMCC |
| R2-1904383 | Introduction of early RLF declaration or fast handover failure recovery for PSCell in MR-DC Samsung Electronics Polska |
| R2-1904387 | Introduction of T312 for IRAT EUTRA measurement in NR Samsung Electronics Polska |
| R2-1904390 | Introduction of T312 for IRAT NR measurement in EUTRA Samsung Electronics Polska |
| R2-1904391 | Introduction of early RLF declaration for PSCell in (NG)EN-DC Samsung Electronics Polska |
| R2-1904392 | Discussion on Fast RLF Recovery optimizations in NR Samsung Electronics Polska |
| R2-1904544 | Robustness through SRB duplication for split bearer solution in NR Nokia, Nokia Shanghai Bell, Huawei, HiSilicon |
| R2-1904980 | Performance of Conditional HO in FR2 Apple Inc. |
| R2-1904984 | On NR Mobility in FR2 Apple Inc. |
| R2-1905057 | Fast handover failure recovery with multiple RACH transmissions LG Electronics Inc |
| R2-1905093 | Consideration to Support Conditional HO in NR LG Electronics Inc. |
| R2-1905094 | Consideration on CHO Configuration LG Electronics Inc. |
| R2-1905141 | NR specific simulation Samsung R&D Institute UK |
| R2-1905142 | consideration of multiple candidate target cell for NR CHO Samsung R&D Institute UK |
| R2-1905143 | Deconfiguration of NR CHO Samsung R&D Institute UK |
| R2-1905144 | Timer for checking the failure of initial access for NR CHO Samsung R&D Institute UK |
| R2-1905145 | Condition for NR CHO Samsung R&D Institute UK |
| R2-1905146 | Data forwarding for NR CHO Samsung R&D Institute UK |
| R2-1905147 | Introduction of T312 in NR Samsung Electronics, Qualcomm Incorporated |
| R2-1905148 | Further enhancement of T312 in NR Samsung R&D Institute UK |
| R2-1905149 | Introducing T312 for Pcell in NR Samsung R&D Institute UK |
| R2-1905150 | Applying T312 on serving frequency in NRSamsung R&D Institute UK |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

CROSS REFERENCE

This Nonprovisional application claims priority under 35 U.S.C. § 119 on provisional Application No. 62/839,424 on Apr. 26, 2019, the entire contents of which are hereby incorporated by reference.

What is claimed is:

1. A wireless terminal that communicates over a radio interface with a wireless access node of a radio access network (RAN), the wireless terminal comprising:
receiver circuitry configured to receive, from the wireless access node, a single Radio Resource Control Reconfiguration (RRCReconfiguration) message including:
a measurement object configuring at least one measurement for a candidate target cell,
a trigger configuration for a conditional handover, and
an identity of the candidate target cell; and
processor circuitry configured to:
perform the at least one measurement based on the measurement object, and
decide, based on the at least one measurement and the trigger configuration, to execute the conditional handover to the candidate target cell without triggering a measurement report regarding the at least one measurement to be sent to the wireless access node, wherein
in response to the decision to execute the conditional handover, the processor circuitry is further configured to transmit a Random Access Preamble to the candidate target cell, and the receiver circuitry is further configured to receive a Random Access Response from the candidate target cell.

2. The wireless terminal of claim 1, wherein the trigger configuration does not include a measurement report configuration.

3. The wireless terminal of claim 1, wherein the trigger configuration comprises one or more events, each of the one or more events comprising at least one offset/threshold value.

4. A method for a wireless terminal that communicates over a radio interface with a wireless access node of a radio access network (RAN), the method comprising:
- receiving, from the wireless access node, a single Radio Resource Control Reconfiguration (RRCReconfiguration) message including:
  - a measurement object configuring at least one measurement for a candidate target cell,
  - a trigger configuration for a conditional handover, and
  - an identity of the candidate target cell;
- performing the at least one measurement based on the measurement object;
- deciding, based on the at least one measurement and the trigger configuration, to execute the conditional handover to the candidate target cell without triggering a measurement report regarding the at least one measurement to be sent to the wireless access node; and
- in response to the decision to execute the conditional handover, transmitting a Random Access Preamble to the candidate target cell, and receiving a Random Access Response from the candidate target cell.

5. An access node of a radio access network (RAN), the access node comprising:
- processor circuitry configured to generate a single Radio Resource Control Reconfiguration (RRCReconfiguration) message including:
  - a measurement object configuring at least one measurement for a candidate target cell,
  - a trigger configuration for a conditional handover, and
  - an identity of the candidate target cell; and
- transmitter circuitry configured to transmit the single RRCReconfiguration message, wherein:
- the single RRCReconfiguration message are used to cause a wireless terminal to:
  - perform the at least one measurement based on the measurement object,
  - decide, based on the at least one measurement and the trigger configuration, to execute the conditional handover to the candidate target cell without triggering a measurement report regarding the at least one measurement to be sent to the access node, and
  - in response to the decision to execute the conditional handover, transmit a Random Access Preamble to the candidate target cell, and receive a Random Access Response from the candidate target cell.

6. The access node of claim 5, wherein the trigger configuration does not include a measurement report configuration.

7. The access node of claim 5, wherein the trigger configuration comprises one or more events, each of the one or more events comprising at least one offset/threshold value.

* * * * *